(12) United States Patent
Huang

(10) Patent No.: US 9,785,355 B2
(45) Date of Patent: *Oct. 10, 2017

(54) NVM EXPRESS CONTROLLER FOR REMOTE ACCESS OF MEMORY AND I/O OVER ETHERNET-TYPE NETWORKS

(71) Applicant: CNEX Labs, Inc., San Jose, CA (US)

(72) Inventor: Yiren Huang, San Jose, CA (US)

(73) Assignee: CNEX Labs, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/843,884

(22) Filed: Sep. 2, 2015

(65) Prior Publication Data

US 2015/0378605 A1    Dec. 31, 2015

(51) Int. Cl.
G06F 3/06       (2006.01)
H04L 29/08      (2006.01)
G06F 13/00      (2006.01)

(52) U.S. Cl.
CPC ............ *G06F 3/061* (2013.01); *G06F 3/0659* (2013.01); *G06F 3/0688* (2013.01); *G06F 13/00* (2013.01); *H04L 67/1004* (2013.01)

(58) Field of Classification Search
None
See application file for complete search history.

(56) References Cited

U.S. PATENT DOCUMENTS

| | | | |
|---|---|---|---|
| 5,862,128 A | 1/1999 | Cooperman et al. | |
| 6,021,047 A | 2/2000 | Lopez et al. | |
| 6,400,730 B1 | 6/2002 | Latif et al. | |
| 6,442,634 B2 | 8/2002 | Bronson et al. | |
| 6,950,895 B2 | 9/2005 | Bottom | |
| 6,958,916 B2 | 10/2005 | Roesner et al. | |
| 6,981,070 B1 | 12/2005 | Luk et al. | |
| 7,519,769 B1 | 4/2009 | Kulkarni et al. | |
| 8,086,791 B2 | 12/2011 | Caulkins | |
| 8,175,094 B2 | 5/2012 | Bauchot et al. | |
| 8,595,385 B1 * | 11/2013 | Shapiro | G06F 13/385 709/253 |
| 2002/0071386 A1 * | 6/2002 | Gronke | H04L 45/00 370/217 |
| 2005/0220020 A1 | 10/2005 | Qureshi et al. | |
| 2006/0013128 A1 | 1/2006 | Connor et al. | |

(Continued)

OTHER PUBLICATIONS

Office Action and Search Report for Taiwanese Patent Application No. TW 103122146, Feb. 17, 2016, 14 Pages.

(Continued)

*Primary Examiner* — Scott B Christensen
*Assistant Examiner* — Lam Do
(74) *Attorney, Agent, or Firm* — Fenwick & West LLP

(57) ABSTRACT

A method and system for enabling Non-Volatile Memory express (NVMe) for accessing remote solid state drives (SSDs) (or other types of remote non-volatile memory) over the Ethernet or other networks. An extended NVMe controller is provided for enabling CPU to access remote non-volatile memory using NVMe protocol. The extended NVMe controller is implemented on one server for communication with other servers or non-volatile memory via Ethernet switch. The NVMe protocol is used over the Ethernet or similar networks by modifying it to provide a special NVM-over-Ethernet frame.

22 Claims, 20 Drawing Sheets

(56) References Cited

U.S. PATENT DOCUMENTS

| | | | |
|---|---|---|---|
| 2006/0047907 A1* | 3/2006 | Shiga | G06F 3/0605 |
| | | | 711/114 |
| 2006/0286993 A1 | 12/2006 | Xie et al. | |
| 2007/0153697 A1* | 7/2007 | Kwan | H04L 12/5693 |
| | | | 370/235 |
| 2007/0234130 A1 | 10/2007 | Sullivan et al. | |
| 2008/0065747 A1 | 3/2008 | Kubota | |
| 2008/0140932 A1 | 6/2008 | Flynn et al. | |
| 2009/0197683 A1 | 8/2009 | Svennebring et al. | |
| 2010/0114889 A1 | 5/2010 | Rabii et al. | |
| 2010/0257281 A1 | 10/2010 | Patel et al. | |
| 2011/0138136 A1 | 6/2011 | Shitomi et al. | |
| 2011/0222413 A1 | 9/2011 | Shukla et al. | |
| 2011/0258488 A1 | 10/2011 | Nightingale et al. | |
| 2012/0014386 A1 | 1/2012 | Xiong et al. | |
| 2012/0023207 A1 | 1/2012 | Gandhewar et al. | |
| 2012/0191665 A1 | 7/2012 | Floyd et al. | |
| 2012/0254484 A1 | 10/2012 | Yang et al. | |
| 2013/0007352 A1 | 1/2013 | Maislos et al. | |
| 2013/0067062 A1 | 3/2013 | Gaitonde et al. | |
| 2013/0086311 A1 | 4/2013 | Huang et al. | |
| 2013/0108263 A1 | 5/2013 | Srinivas et al. | |
| 2013/0135816 A1 | 5/2013 | Huang | |
| 2013/0163175 A1 | 6/2013 | Kim et al. | |
| 2013/0191590 A1 | 7/2013 | Malwankar | |
| 2013/0198311 A1 | 8/2013 | Tamir et al. | |
| 2014/0002988 A1 | 1/2014 | Roesner et al. | |
| 2014/0089553 A1 | 3/2014 | Ma | |
| 2014/0195634 A1 | 7/2014 | Kishore et al. | |
| 2014/0250073 A1 | 9/2014 | Zalpuri et al. | |
| 2014/0281040 A1 | 9/2014 | Liu | |
| 2014/0281123 A1* | 9/2014 | Weber | G06F 12/0246 |
| | | | 711/103 |
| 2014/0372675 A1* | 12/2014 | Higeta | G06F 12/0246 |
| | | | 711/103 |
| 2015/0006663 A1 | 1/2015 | Huang | |
| 2015/0012735 A1 | 1/2015 | Tamir et al. | |
| 2015/0055508 A1* | 2/2015 | Ashida | H04L 45/00 |
| | | | 370/254 |
| 2015/0222705 A1* | 8/2015 | Stephens | G06F 3/0611 |
| | | | 709/214 |
| 2015/0261720 A1 | 9/2015 | Kagan et al. | |
| 2015/0304423 A1 | 10/2015 | Satoyama et al. | |
| 2015/0370668 A1* | 12/2015 | Nazari | H04L 41/0668 |
| | | | 714/6.3 |
| 2015/0372867 A1 | 12/2015 | Amann et al. | |
| 2016/0117227 A1* | 4/2016 | Hetrick | G06F 11/1469 |
| | | | 714/19 |
| 2016/0127468 A1* | 5/2016 | Malwankar | G06F 9/45558 |
| | | | 709/212 |
| 2016/0127492 A1* | 5/2016 | Malwankar | H04L 67/2842 |
| | | | 709/212 |
| 2016/0127509 A1 | 5/2016 | Uriel | |
| 2016/0162438 A1 | 6/2016 | Hussain et al. | |

OTHER PUBLICATIONS

Office Action for U.S. Appl. No. 14/191,335, Jan. 8, 2016, 148 Pages.

Cisco, "Deploying IIPv6 in Unified Communications Network with Cisco Unified Communications Manager 8.0(x)", IPv6 Basics, Chapter 2, Jun. 8, 2010, 10 Pages, Can be retrieved at <URL:http://www.cisco.com/c/en/us/td/docs/voice_ip_comm/cucm/srnd/ipv6/ipv6srnd/basics.pdf>.

Cobb, D., "Nvm express and the pci express* ssd revolution," Intel Developer Forum, 2012, 48 Pages.

Intel "Intel Core 2 Quad Processor" Product Brief, Jan. 15, 2007, 2 Pages, Can be retrieved at <URL:http://web.archive.org/web/20070115184018/http://www.intel.com/products/processor/core2quad/prod_brief.pdf>.

Intel, "Intel 10 Gigabit AF DA Dual Port Server Adapter," Product Brief, Sep. 25, 2007, 4 Pages, Can be retrieved at <URL:http://web.archive.org/web/20110925095033/http://www.dell.com/downloads/global/products/pwcnt/en/intel_10_gig_afda_dual_port_prodbrief.pdf>.

Kessler, G., "Binary Numbers and Subnet Masks," Oct. 2000, 4 Pages, Can be retrieved at <URL:http://www.garykessler.net/library/subnet_masks.html, Oct. 2000>.

Kozierok, C., "The TCP/IP guide: a comprehensive, illustrated Internet protocols reference," No Starch Press, Oct. 4, 2005, 30 Pages, Safari Books.

NVM Express Management Interface "NVM Express Management Interface," Revision 1.0, Nov. 17, 2015, 96 pages, Can be retrieved at <URL:http://www.nvmexpress.org/wp-content/uploads/NVM Express_Management_Interface1_0_gold.pdf>.

Hedlund, B., "Top of Rack vs End of Row Data Center Designs," Apr. 5, 2009, 15 Pages, Can be retrieved at URL:http://bradhedlund.com/2009/04/05/top-of-rack-vs-end-of-row-data-center-designs/>.

Office Action for U.S. Appl. No. 14/954,691, Jan. 20, 2017, 99 Pages.

PCT International Search Report and Written Opinion for PCT/US16/49759, Jan. 19, 2017, 16 Pages.

Invitation to Pay Additional Fees and, Where Applicable, Protest Fees for PCT/US16/49759, Nov. 3, 2016, 2 Pages.

"How the Computer Works: The CPU and Memory" Dec. 15, 2003, 7 Pages, Can be retrieved on the Internet <URL:2003http://web.archive.org/web/20031215230244/http://homepage.cs.uri.edu/faculty/wolfe/book/Readings/Reading04.htm>.

"NVM Express Organization Initiates "NVM Express over Fabrics" Effort; NVMe Specification Revision 1.2 Approaching Ratification;" Sep. 3, 2014, 3 pages, Can be retrieved on the Internet <URL:http://www.nvmexpress.org/wp-content/uploads/NVM_Express_oF-1_2_Press_Release.pdf>.

"NVM Express Explained." Aug. 22, 2016, 5 Pages, Archived on web.archive.org, Can be retrieved on the Internet <URL: Http://web.archive.org/web/20130822213348/http://www.nvmexpress.org/wpcontent/uploads/2013/04/NVM_whitepaper.pdf>.

Pillial, S., "How does Indexing Makes Database Faster;" Apr. 13, 2013, 11 Pages, Can be retrieved on the Internet <URL:http://www.slashroot.in/how-does-indexing-makes-database-faster>.

Walker, D., "A Comparison of NVMe and AHCI," NVM Express, Jul. 31, 2012, 40 Pages, Can be retrieved on the Internet <URL:https://sata-io.org/system/files/memberdownloads/NVMe%20and%20AHCI_%20long_.pdf>.

PCT International Search Report and Written Opinion, PCT Application No. PCT/US2014/043279, Oct. 29, 2014, twelve pages.

Wikipedia, "NVM Express," Last Modified Jun. 9, 2015, 5 pages, [online] [retrieved on Jun. 18, 2015] Retrieved from the internet <URL:https://en.wikipedia.org/wiki/NVM_Express>.

* cited by examiner

200

| NVMe HSID/NSID | MAC address | Host/Device | Active/Inactive | Static/Dynamic |
|---|---|---|---|---|
| HSID 0.0.0.0.1.0.0.0 | 25.32.63.0.0.0 | Host | Active | Static |
| HSID 0.0.0.0.1.0.0.1 | 25.32.63.0.0.1 | Host | Active | Static |
| NSID 0.0.128.0 | 25.32.63.0.0.2 | Device | Active | Static |
| NSID 0.0.128.1 | 25.32.63.0.0.3 | Device | Inactive | Dynamic |
| | | | | |

| NVMe NSID | MAC address | Host/ Device | Active/ Inactive | Static/ Dynamic | Registered HSID | CNTL ID (Controller ID) |
|---|---|---|---|---|---|---|
| NSID 0.0.128.0 | 25.32.63.0.0.2 | Device | Active | Static | HSID 0.0.0.0.1.0.0.1 | CNTL ID 0.0.0.0.1.0.0.1 |
| | | | | | HSID 0.0.0.0.1.0.0.2 | |
| NSID 0.0.128.1 | 25.32.63.0.0.3 | Device | Inactive | Dynamic | HSID 0.0.0.0.1.0.0.3 | CNTL ID 0.0.0.0.1.0.0.3 |

1250 ns is supported by a mapping table for mapping host

NVM EXPRESS CONTROLLER FOR REMOTE ACCESS OF MEMORY AND I/O OVER ETHERNET-TYPE NETWORKS

BACKGROUND OF THE INVENTION

1. Field of the Invention

This invention generally relates to accessing remote memory with low latency by using the Non-Volatile Memory Express (NVMe) protocol over a network.

2. Description of the Related Art

Typically, a CPU can access remote memory or I/O devices over a network by using network protocols. One conventional approach to access remote memory or I/O devices is through iSCSI storage. This approach uses significant processing by the CPU, which increases total access latency. Accessing remote memory or I/O devices via iSCSI storage usually has latency four to five times greater than a direct access of local memory or I/O devices. This leads to noticeable performance and throughput degradation for systems requiring remote memory or I/O devices access over a network.

A relatively new interface standard that deals with local non-volatile memory access is NVM Express (NVMe), sometimes referred to as the Non-Volatile Memory Host Controller Interface Specification. NVMe is a register-level interface that allows host software to communicate with a non-volatile memory subsystem. This interface is optimized for enterprise and client solid state drives (SSDs), which is typically attached to the PCI Express (PCIe) interface. NVMe provides a direct I/O access to local non-volatile memory. Using NVMe, the latency of read and write operations is reduced, compared with connecting over traditional I/O interfaces, such as SAS (Serial SCSI) or SATA (Serial ATA).

However, NVMe has a limitation pertaining to passing of data over Ethernet switches or other types of networks. Generally, NVMe is designed to access local SSDs and is not defined in terms of accessing remote storage through a network. NVMe as defined today does not provide solutions for accessing multiple remote SSDs by multiple host CPUs through a network. Accordingly, there is a need to enable NVMe to work efficiently over a network (e.g., Ethernet network) for accessing remote SSDs and name spaces over the network.

SUMMARY

The present invention overcomes the limitations of the prior art by providing a system that enables the access of remote non-volatile memory over an external network (such as Ethernet) using NVMe commands. In one aspect, an extended NVMe controller provides this capability.

In one approach, an extended NVMe controller enables a CPU to access remote non-volatile memory (e.g., SSDs) using the NVMe protocol. For example, the extended NVMe controller is implemented on one server for communication with other servers or SSDs via an Ethernet switch. The NVMe protocol can be used over Ethernet by providing an NVM-over-Ethernet (NVMoE) frame. In one implementation, an NVMoE frame is defined specifying an NVMoE command transmitted by the extended NVMe controller over the Ethernet network. The extended NVMe controller includes a conversion mechanism for converting an NVMe command to an NVMoE command based on the definition of the NVMoE frame. Specifically, the conversion mechanism is supported by a mapping table for mapping host identifier (HSID) of NVMe controller and/or namespace identifier (NSID) of the NVMe command to Ethernet media access control (MAC) addresses included in the NVMoE command.

In another aspect, the extended NVMe controller is equipped with a retry mechanism for recovering from loss of NVMe commands transmitted over the external network. The retry mechanism includes a timer for detecting a loss of an NVMe command and if the NVMe command is determined to be lost according to the timer, the retry mechanism will reissue the NVMe command.

In yet another aspect, the extended NVMe controller enables multi-path I/O and namespace sharing. Multi-path I/O refers to two or more completely independent physical PCIe paths between a single host and a namespace. Namespace sharing refers to the ability for two or more hosts to access a common shared namespace using different NVMe controllers. One or more of the extended NVMe controllers can enable a host to access a single namespace through multiple PCIe paths and two or more hosts to access a shared namespace.

Another aspect of the invention includes an extended NVMe storage network including multiple local NVMe storage nodes and an external network coupling the multiple NVMe storage nodes. The local NVMe storage nodes include one or more host processors, the extended NVMe controllers as described above and local non-volatile memories.

In one exemplary embodiment, the external network can include an L3 network. Accordingly, the extended NVMe controllers can include command translators for translating the NVMe commands to NVMoE commands encapsulated by L3 packet headers and thus suitable for transmission over the L3 network.

Various example applications of the extended NVMe storage network are also described herein to suit different scenarios. In one application, the extended NVMe storage network is implemented as a server rack, where the local storage nodes include servers in the server rack and external network includes a top of rack Ethernet switch. In another application, the extended NVMe storage network is implemented as a single server including a single host, where each local NVMe storage node includes a dedicated extended NVMe controller and a dedicated local non-volatile memory based name space. In yet another example application, the extended NVMe storage network includes at least two host processors and provides redundancy via the two extended NVMe controllers.

In an additional embodiment, the extended NVMe controller supports load balancing. To achieve the load balancing, a local storage interface of the extended NVMe controller couples the extended NVMe controller to a local namespace for a local non-volatile memory via memory channels of the local non-volatile memory such that the memory channels are coupled in an even distribution to a plurality of ports of the extended NVMe controller.

In another additional embodiment, an extended NVMe directory server includes a network interface to couple the directory server to an external network that has a plurality of extended NVMe controllers. The directory server also has a memory adapted to store mappings between assigned NVMe identifiers and network addresses. The directory server also has a processor to send one or more messages to the extended NMVe controllers to assign available NVMe identifiers to the extended NVMe controllers that request an NVMe identifier and store the assignment as a mapping in the memory.

In another embodiment, the extended NVMe controller supports flow control by probing remote extended NVMe controller for a remote buffer status and transmitting a buffer status of each of its buffers to the remote extended NVMe controller.

Other aspects of the invention include methods, systems, components, devices, improvements, applications and other aspects related to those described above.

Additional features and advantages of the invention will be set forth in the description that follows, and in part will be apparent from the description, or may be learned by practice of the invention. Various advantages of the invention may be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 3B is an exemplary mapping table of HSID/NSID to MAC addresses.

FIG. 3C is another exemplary mapping table of HSID/NSID to MAC addresses including registered HSIDs.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Typically, an NVMe controller is associated with a single PCI Function. The capabilities that a controller supports are indicated in the Controller Capabilities (CAP) register and as part of the controller and namespace data structures returned by an identify command. The controller data structure indicates capabilities and settings that apply to the entire controller. The namespace data structure indicates capabilities and settings that are specific to a particular namespace. In addition, the NVMe controller is based on a paired submission and completion queue mechanism. Commands are placed by the host software into a submission queue. Completions are placed into the associated completion queue by the controller. Multiple submission queues may utilize the same completion queue. The submission and completion queues are allocated in host memory.

The present invention is directed to a method for enabling access to remote non-volatile memory (e.g., SSD) name spaces over a network using NVMe protocol, to reduce access latency. Accordingly, an extended NVMe controller enables the host CPU to access remote non-volatile memory using NVMe protocol. The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
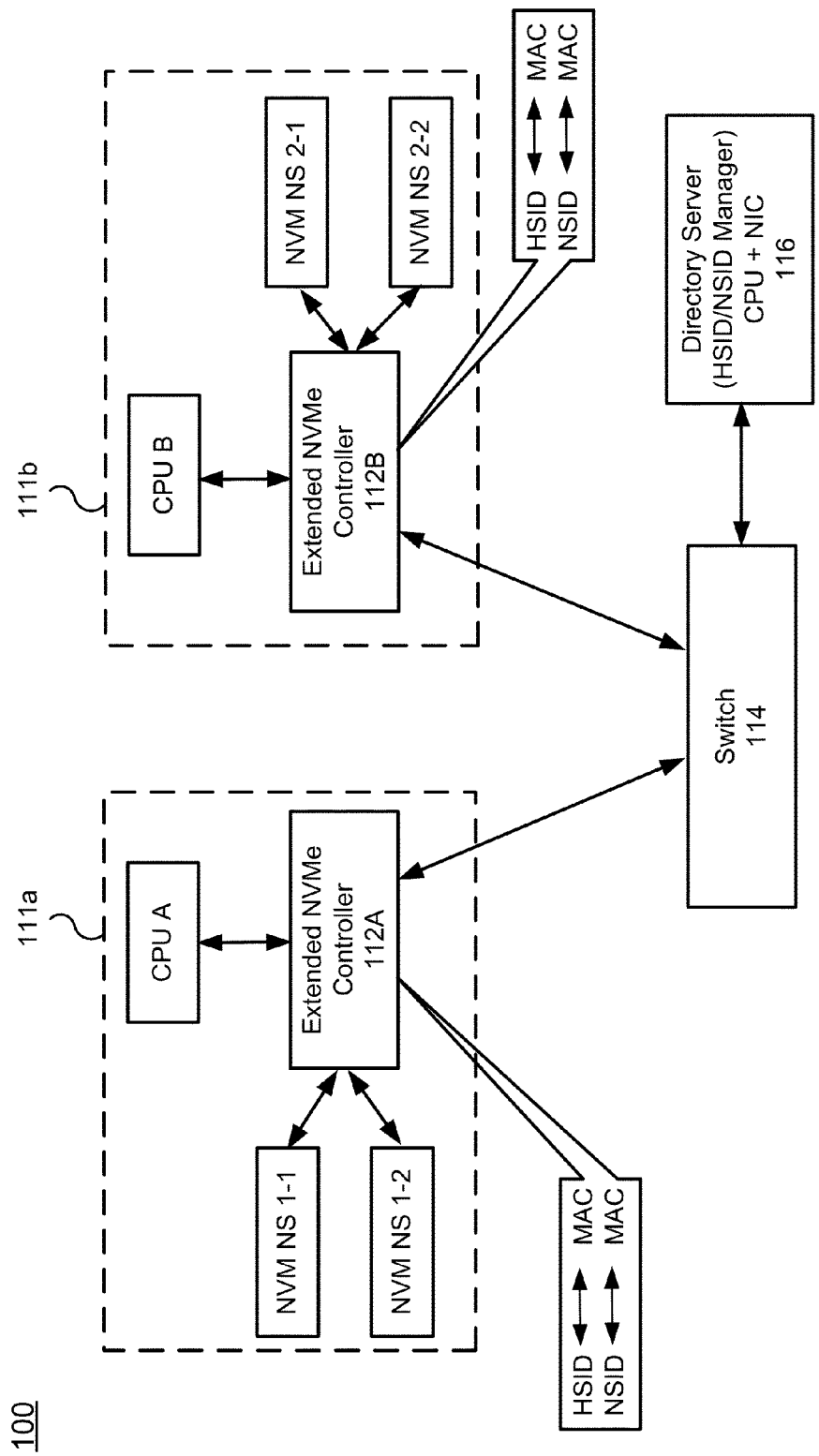
FIG. 1 is a block diagram of a system illustrating an extended NVMe storage network.

Referring now to FIG. 1, a block diagram of a system 100 illustrating an extended NVMe storage network is depicted according to one exemplary embodiment. The extended NVMe storage network 100 can be one example of an NVMe over Ethernet architecture. In the illustrated exemplary embodiment, the extended NVMe storage network 100 includes two local NVMe storage nodes 111a, 111b and an external network (including a switch 114) coupling the two local NVMe storage nodes 111a, 111b. The extended NVMe storage network 100 also includes a directory server 116 communicatively coupled to the external network that includes the switch 114. In one embodiment, the external network is an Ethernet network. In other embodiments, the external network can be fibre channel (FC) or InfiniBand (IB) type of network.

The two local NVMe storage nodes 111a, 111b each include a host processor (e.g., CPU A, or CPU B), an extended NVMe controller 112A, 112B, and local non-volatile memories represented by NVMe namespaces (e.g., NVM NS 1-1 and NVM NS 1-2, or NVM NS 2-1 and NVM NS 2-2). In one embodiment, the non-volatile memory is a solid-state drive (SSD). In another embodiment, the non-volatile memory is a hard disk drive. The extended NVMe controllers 112A, 112B are coupled to the CPUs, e.g., CPU A, CPU B, respectively via their own host interfaces. For example, the host interface included in an extended NVMe controller 112A, 112B may be a PCI Express (PCIe) interface. In addition, the extended NVMe controllers 112A, 112B include their respective direct network interfaces to couple them to the external network (including the switch 114). For example, for coupling the extended NVMe controllers 112A, 112B to an Ethernet network, the direct network interfaces can be Ethernet MAC interfaces. Furthermore, the extended NVMe controllers 112A, 112B are each coupled to their local NVMe namespaces for local non-volatile memories via one or more local storage interfaces. For example, the extended NVMe controller 112A is coupled to its local NVMe namespaces (e.g., NVM NS 1-1 and NVM NS 1-2) via a local storage interface. Similarly, the extended NVMe controller 112B is coupled to its local NVMe namespaces (e.g., NVM NS 2-1 and NVM NS 2-2) via another local storage interface included in the controller 112B.

Within the nodes 111a, 111b, respectively, the extended NVMe controllers 112A, 112B receive from their host CPUs (e.g., CPU A, CPU B) NVMe commands directed to their local NVMe namespaces (e.g., NVM NS 1-1 and NVM NS 1-2, or NVM NS 2-1 and NVM NS 2-2) and provide the CPUs the I/O access to their local namespaces. For example, the extended controller 112A may receive NVMe commands from the CPU A for accessing the local namespaces NVM NS 1-1 and NVM NS 1-2. Since the NVMe controllers 112A, 112B have a clear definition for the addresses of their local namespaces, the NVMe controller 112A, 112B can process the commands accordingly.

In one embodiment, the extended NVMe controller 112A, 112B (also referred to individually or collectively as 112) may receive from its host CPU (e.g., CPU A or CPU B) NVMe commands directed to a remote namespace for remote non-volatile memories coupled to the external network. For example, the extended NVMe controller 112A may receive from the CPU A an NVMe command directed to the NVM NS 2-1 or NVM NS 2-2 coupled to the external network. This occurs when, for example, the CPU A in node 111a desires to read/write data from/to the remote namespace NVM NS 2-1 or NVM NS 2-2 in node 111b. According to the illustrated exemplary embodiment in FIG. 1, the extended NVMe controller 112 can apply an NVMe over Ethernet (NVMoE) protocol to transmit the NVMe command over the external network switch (e.g., a Converged Enhanced Ethernet Switch or even the traditional Ethernet Switch). Such a new protocol beneficially allows a CPU to use the NVMe protocol to access a name space attached to a different extended NVMe controller or to call a remote namespace. This further enables the CPU to access to a remote namespace with only the local access latency.

To achieve this, the extended NVMe controller 112 converts the NVMe commands directed to a remote namespace into a format suitable for transmission over the external network so that the commands can be transmitted to another extended NVMe controller 112 locally coupled (such as coupled via a local storage interface) to the remote namespace. Typically, an NVMe controller has a 64-bit host identifier (HSID) and an NVMe namespace has a 32-bit namespace identifier (NSID). The HSID is configurable through NVMe controller registers. The NSID is a continuous sequence of namespaces 1-$n$, where n is the total number of available namespaces. In one exemplary embodiment, the extended NVMe controller 112 may convert an NVMe command to a suitable format for transmission over Ethernet by utilizing a mechanism for mapping the HSID and NSID in the NVMe command to Ethernet MAC addresses used for transmission over Ethernet. A definition of the format for the NVMe commands suitable for transmission over Ethernet is illustrated in FIG. 2.

Figure 2:
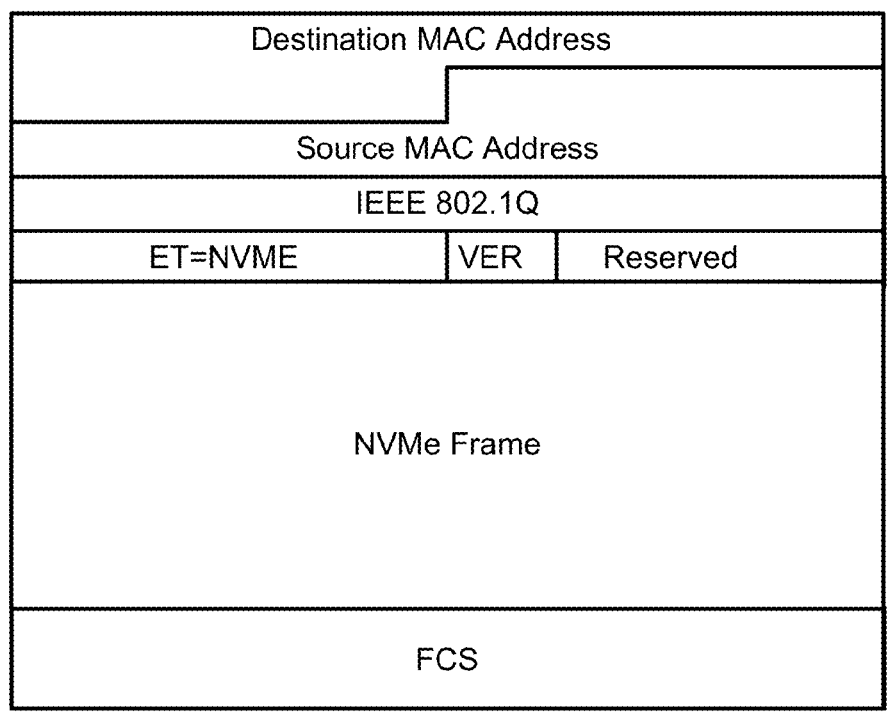
FIG. 2 is a diagram of an NVMoE frame definition.

Accordingly, FIG. 2 illustrates a definition for NVMe over Ethernet (NVMoE) frame structure 200, in accordance with one exemplary embodiment. The NVMe over Ethernet (NVMoE) frame 200 includes a destination MAC address (e.g., a 48-bit destination MAC address). Among all bits of the MAC address, the 24 most significant bits construct the Organizationally Unique Identifier (OUI). The NVMoE frame also includes a source MAC address (e.g., a 48-bit source MAC address); an IEEE 802.1Q tag such as a virtual local area networks (VLAN)/quality of service (QoS) 1Q tag; a type code "ET"; and a version number "VER" (e.g., a 4-bit version number). The type code "ET" can be used to indicate that this is an NVMe-over-Ethernet type of frame. In addition, the NVMoE frame 200 includes an NVMe frame defining the Admin and I/O command, and a frame check sequence (FCS) (e.g., a 32-bit frame checksum for the entire NVMoE frame). In this example, there is no separate cyclic redundancy check (CRC) for the NVMe frame. In one embodiment, the extended NVMe controller 112 can use an NVMoE frame, such as the frame 200 shown in FIG. 2, to specify an NVMe command in a format suitable for transmission over Ethernet.

Referring back to FIG. 1, also illustrated is an HSID and NSID assignment mechanism in accordance with the exemplary embodiment. In the NVMe over Ethernet protocol, an HSID includes 64 bits configured by the CPU. When the CPU, which has the extended NVMe controller 112 attached, sends a command to a remote NVMe namespace, it communicates with the directory server 116. In one exemplary embodiment, the directory server 116 may be a software-defined storage (SDS) controller. In practice, the SDS controller 116 can reside on the same CPU that manages the network switch 114. However, it can also be implemented on a separate CPU from the one managing the switch 114. The SDS controller 116 has a directory that manages all the HSIDs and NSIDs of the NVMe storage nodes 111a, 111b (also referred to individually or collectively as 111) within the entire extended NVMe storage network 100 so that there are no repetitions of the assigned HSIDs as well as the assigned NSIDs. For example, for different local NVMe storage nodes 111, the SDS controller 116 assigns different HSIDs to different CPUs and different NSIDs to different namespaces. Therefore, each namespace in a storage node 111 has unique HSID and NSID. For different CPUs such as CPU A and CPU B, the NSIDs of the same namespace can be different, while in the upper layer application, the namespace is understood as the same logical namespace despite its different namespace IDs.

Figure 3A:
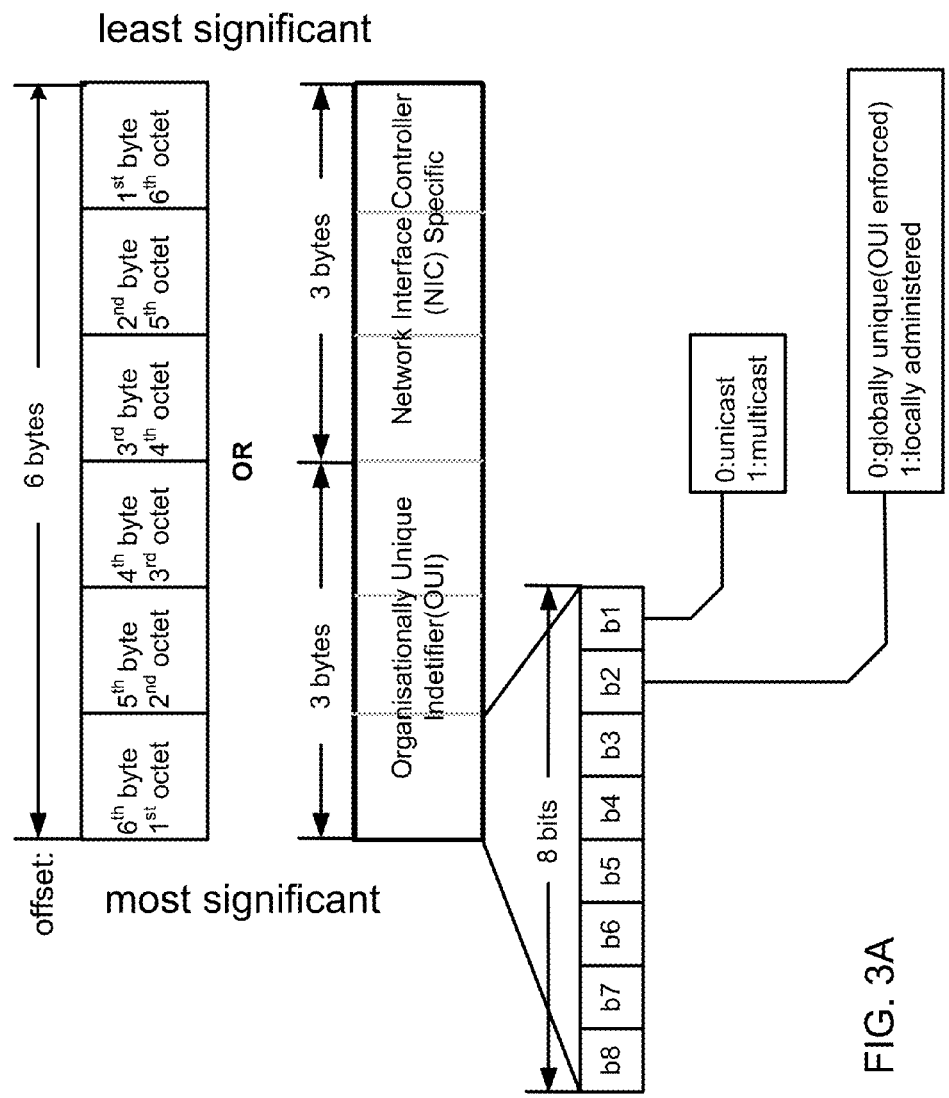
FIG. 3A is a diagram of a first portion of the NVMoE frame definition, as depicted in FIG. 2.

FIG. 1 also illustrates an NVMe to Ethernet mapping table in accordance to the exemplary embodiment. Once the HSIDs and the NSIDs are assigned, in order to transmit and receive NVMe commands and data through the Ethernet switch 114, the extended NVMe storage network 100 maps HSID of an extended NVMe controller and NSID of an NVMe namespace to MAC addresses. FIG. 3A illustrates a structure for 48-bit MAC addresses. Accordingly, for mapping the 64-bit HSID to the 48-bit MAC address, a 64-bit to 48-bit mapping is used. The extended NVMe controller 112 uses the OUI for the most significant 24 bits of the MAC address and uses the assigned HSID [23:0] as the starting address to fill out the network interface controller (NIC)

specific lower 24 bits of the MAC address. Other mappings are possible if more than the lower 24 bits of the HSID are desired.

For NSID to MAC address mapping, a 32-bit to 48-bit mapping is used. The extended NVMe controller 112 uses the above HSID mapped MAC address and local NSID as the name space MAC address. That is, the upper 24 bits of the MAC address are the OUI; the lower 24 bits are used for the NSID specific value. (Again, other mappings are possible if more than the lower 24 bits of the NSID are desired.) In this way, the MAC addresses used by the extended NVMe controller can be contiguous and easy to manage. One extended NVMe controller card uses 1+n addresses in the MAC address space, where the 1 address is used for the HSID and the n addresses are used for the NSID namespaces used by the namespace controllers. NSIDs for other extended NVMe controller are mapped based on their OUIs and starting NIC IDs. In one embodiment, the SDS controller of the directory server 116 can handle and manage the mapping of the HSID and NSID to the MAC addresses. In other exemplary embodiment, the extended NVMe controller 112 can handle the mapping of the HSID and NSID to the MAC addresses by maintaining a mapping table for mapping the HSID and NSID to the MAC addresses.

In one embodiment, this mapping makes it possible to use the L2 learning mechanism, since the embodiment uses the Ethernet MAC address to identify the HSID and NSID. Thus, the behavior of L2 network switch can be applied. In one embodiment, one directory server 116 also manages the converged enhanced Ethernet (CEE) MAC address to the physical port mapping. In one embodiment, Single Root I/O Virtualization (SR-IOV) support may use different MAC address per virtual function (VF) of the extended NVMe controller.

Once the HSID and NSID are mapped to Ethernet MAC addresses, as illustrated in FIG. 3A, the extended NVMe controller 112 uses the MAC addresses to generate the NVMoE frame as illustrated in FIG. 2. Accordingly, FIG. 3A also illustrates the first portion (e.g., the MAC addresses) of the NVMoE frame depicted in FIG. 2.

In one embodiment, the mapping of HSID and NSID to MAC addresses is stored in a table 330 as illustrated in FIG. 3B. This mapping table may be stored in the directory server 116. As illustrated in FIG. 3B, the mapping table maps HSIDs or NSIDs (depending on whether the device is a host or storage device) to MAC addresses. The mapping table also indicates whether the mapped device is a host or storage device (i.e., storage node), whether it is active or inactive (i.e., unreachable), and whether the mapping is statically populated or dynamically populated (i.e., learned using network discovery). In one embodiment, a host and storage device share the same MAC address and the same physical port on an extended NVMe controller. For example, both a host and a storage device may be coupled to the same NVMe controller, which has a single Ethernet MAC interface. In such a case, the host and storage device share the same MAC address.

In one embodiment, before a storage device is shut down, it notifies the directory server 116 regarding the shutdown, upon which the directory server 116 notifies the attached hosts to cease further communication with that particular storage device (e.g., non-volatile memory). In order to do this, the directory server 116 preferably knows which hosts are registered (e.g., by an active session) with the storage device. This may be stored in the mapping table, as is illustrated in the exemplary table 360 in FIG. 3C. In the exemplary table 360, two hosts with HSIDs of "0.0.0.0.1.0.0.1" and "0.0.0.0.1.0.0.2" are registered with the storage device with NSID "0.0.128.0". The directory server 116 may have received this request to register from the hosts. The registration indicates that these two hosts may be communicating with the storage device (e.g., via an active session). When the directory server 116 receives a shutdown notification from the storage device with NSID "0.0.128.0", it notifies the hosts with HSIDs of "0.0.0.0.1.0.0.1" and "0.0.0.0.1.0.0.2" to cease communication with the storage device due to the shutdown. In one embodiment, the directory server 116 waits for an acknowledgement from the hosts indicating that communications have ceased (or waits for a timeout), and in response the directory server 116 notifies the storage device that it may proceed with the shutdown. In one embodiment, the exemplary table 360 also stores a controller ID for each NSID. This is the identifier of the extended NVMe controller that the corresponding namespace with the NSID is physically coupled to.

In one embodiment, the directory server 116 and the devices on the NVMoE network support a specialized address allocation and management protocol, which may be referred to as Non-Volatile Memory Address Resolution (NVMAR) protocol. NVMAR allows for the allocation of HSIDs and NSIDs to devices. NVMAR may include a mapping table having MAC addresses, HSID/NSIDs, namespace (NS) reservation state, NS error state, and NS globally unique identifier (GUID), similar to the mapping tables shown in FIGS. 3B-C. This mapping information may be shared among the various devices in the network upon request. In one embodiment, the mapping table is persistent over reboots and other shutdown or error events.

Figure 3D:
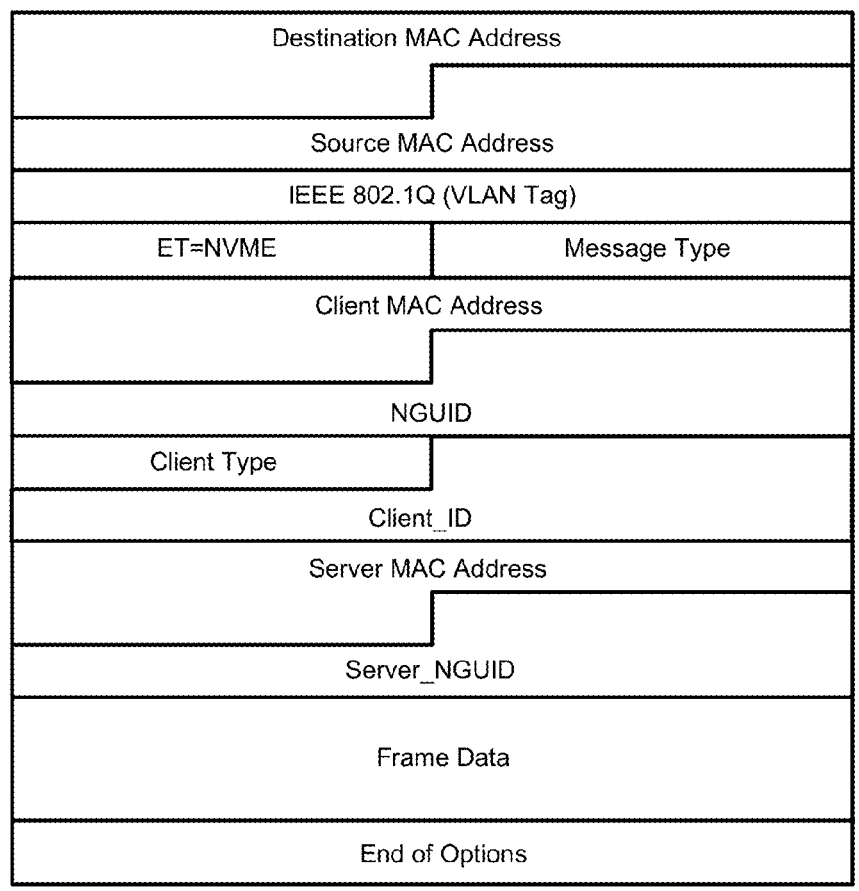
FIG. 3D illustrates an exemplary message format for Non-Volatile Memory Address Resolution (NVMAR) protocol.

FIG. 3D illustrates an exemplary message format 390 for NVMAR. In the message, the destination and source MAC addresses are the destination and source for the message. The VLAN tag identifies the VLAN for the NVMe over Ethernet network. A new ether type may be indicated for the NVMAR message. The client MAC is the device communicating with the directory server 116. An NGUID is a globally unique identifier for the device. The client type indicates whether the device is a host or a storage device. The client ID is the HSID/NSID for the device. The server NGUID is a globally unique identifier for the directory server 116. The end of options indicates the end of the message.

In some embodiments, multiple NVMAR message types are defined. These may include but are not limited to an ID discovery message, an ID offer message, an ID request message, an ID acknowledgement message, an ID negative acknowledgement message, an ID release message, an ID identify message, an ID notify message, an ID reply message, an ID reserve message, and an ID tag message. Additional frame data may be included in the message depending upon the type of the message.

In order to obtain an HSID/NSID, a device (e.g., a host or storage node) broadcasts an ID discovery message during an initial state to discover the directory server 116 supporting NVMAR. In some embodiments, more than one NVMAR supporting server may exist. The message type for an ID discover message may be "IDDISCOVER". The client ID field is set to zero for such a message. The destination MAC may be a broadcast MAC address. Subsequently, the directory server 116 responds with an ID offer message, with message type "IDOFFER". The client ID field is set to the offered HSID/NSID that is available for the device to take. The device may then send an ID request message with message type "IDREQUEST" to the directory server 116 to request the offered HSID/NSID. The directory server 116 responds with an ID acknowledgement message with message type "IDACK" indicating acknowledgement of the request. Alternatively, the directory server 116 may respond with an ID negative acknowledgement message with message type "IDNACK" indicating failure to allocate the particular HSID/NSID.

At some point, a device may wish to cancel its HSID/NSID allocation (e.g., when shutting down or becoming inactive). The device may then send an ID release message to the directory server 116. The ID release message may include additional frame data indicating a release status (e.g., graceful shutdown).

In another aspect, a host device may send an ID identify message to the directory server 116 to request the status of allocated HSID/NSIDs. The frame data for this message may include an identifier for the identify request. The directory server 116 may send an ID reply message to an ID identify message with frame data including the entries in the HSID/NSID and MAC address mapping table.

In yet another aspect, the directory server 116 may send an ID notify message to any registered hosts of a storage device indicating any issues such as a missing heartbeat, an error, an ID release message, inactivity of the storage device, and so on. The frame data for such a message may additionally include an identifier of the issue in question.

A host device may send an ID reserve message to the directory server 116 indicating that it wishes to communicate with a storage device. The frame data for this message may additionally include an indication to reserve or unreserve the storage device. The directory server 116 may then update the registered HSIDs for the storage device to include the HSID of the host device.

A device may further send an ID tag message indicating a current status (e.g., a heartbeat). This message may include frame data with information regarding the status (e.g., active or inactive). This may be in response to a polling request by the directory server 116.

Figure 4:
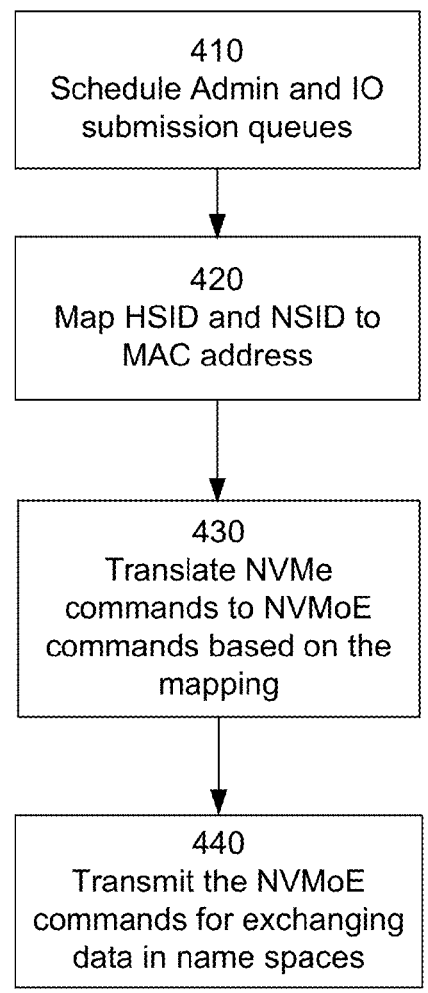
FIG. 4 is a flow diagram of a method for enabling NVMe commands to be transmitted over Ethernet.
Figure 5:
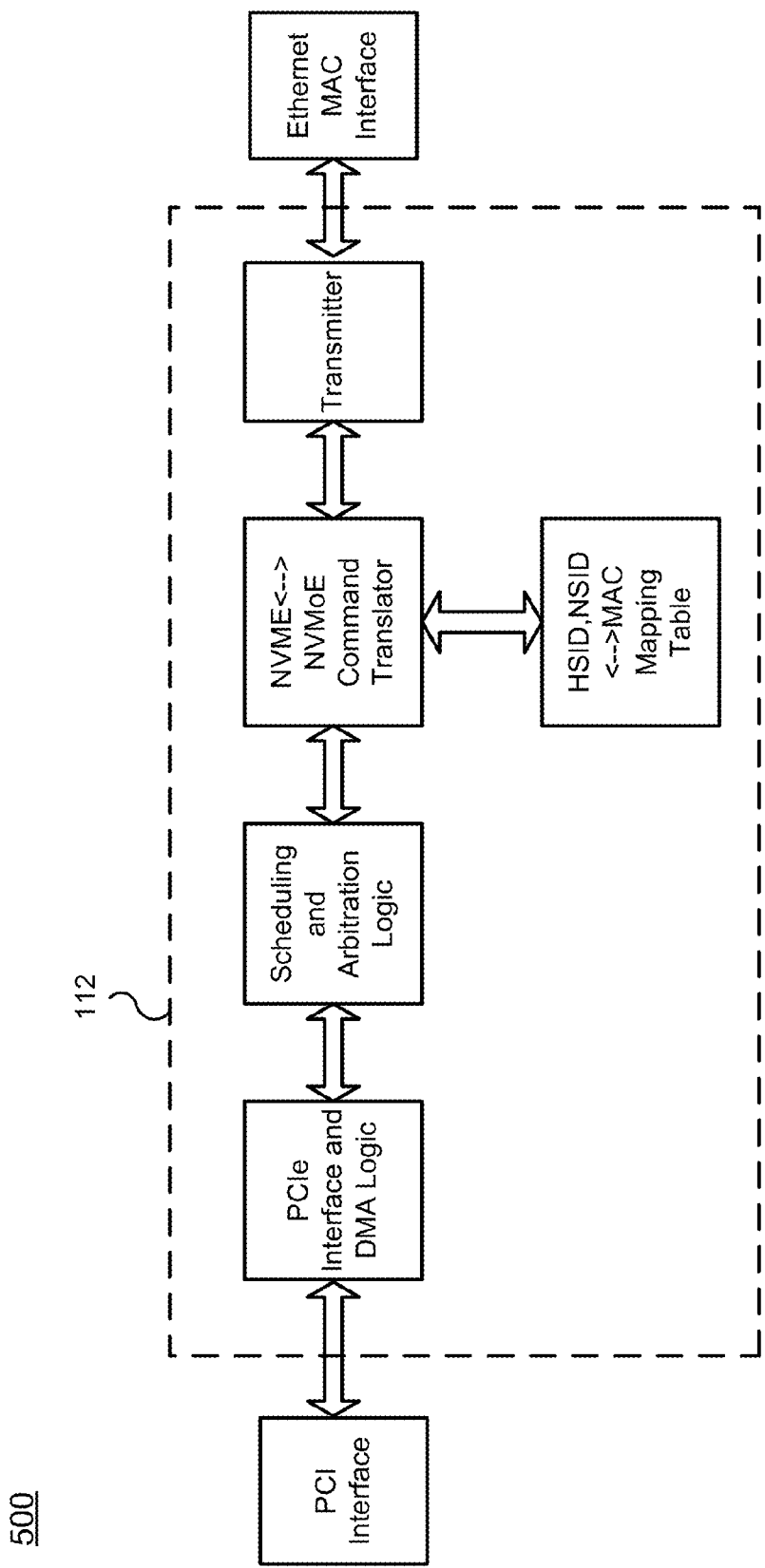
FIG. 5 is a block diagram of an extended NVMe controller.

Referring now to FIGS. 4-5, FIG. 4 illustrates a flow diagram of a method for enabling NVMe commands to be transmitted over Ethernet in accordance with one exemplary embodiment. FIG. 5 illustrates an exemplary extended NVMe controller, corresponding to one embodiment of the method depicted in FIG. 4. In the illustrated embodiment, the extended NVMe controller 112 includes a PCIe interface and DMA logic module for receiving NVMe commands and/or data from the host processor (CPU) through the PCI interface. The received NVMe commands and/or data can be directed to a local namespace for a local memory/storage or to a remote namespace for a remote memory/storage. The PCIe interface and DMA logic module is responsible for handling the PCIe read and write commands from and to the host CPU and also for scheduling the DMA write and read to and from the CPU host memory.

The extended NVMe controller 112 can also include a scheduling and arbitration logic module (or a scheduler and arbiter) that will schedule 410 administrative (Admin) and input/output (I/O) submission queues for processing and transmission of the received commands and/or data. Further, the extended NVMe controller 112 can convert the received NVMe commands to a format suitable for transmission over the external network to another NVMe controller 112 coupled to a remote namespace. For example, the extended NVMe controller 112 includes an NVMe to NVMoE command translator for mapping 420 the HSID and NSID to MAC addresses and translating 430 the NVMe commands to NVMoE commands based on the mapping. Specifically, in one exemplary embodiment, the command translator includes an NVMe to NVMoE mapper that can query a mapping table for mapping the HSID and NSID to Ethernet MAC addresses. Based on the mapping, the command translator can translate the NVMe commands to the NVMoE commands.

NVMe commands include a priority level that determines the priority in which an NVMe controller fetches a command for execution. Commands in a higher priority queue are fetched before those in a lower priority queue. Admin commands are set to the highest priority, with one or more priority levels below this highest priority level. In one embodiment, when translating commands from NVMe to NVMoE, the highest priority of an Admin command, and any other lower NVMe priority levels, are translated into an Ethernet frame with an appropriate IEEE 802.1Q Priority Code Point (PCP) field such that the priority level is reflected in the Ethernet frame. The mapping of NVMe priority levels to PCP field value may be based on a mapping table.

The extended NVMe controller 112 further includes a transmitter that transmits 440 the NVMoE commands to another extended NVMe controller 112 coupled to the network for exchanging data in the remote namespace coupled to the other controller 112. The transmitter will transmit the NVMoE commands over the Ethernet via the Ethernet MAC interface based on the mapped Ethernet MAC addresses.

Those skilled in the art will appreciate that the proposed extended NVMe controller 112 is scalable. The extended NVMe controller 112 provides remote access to SSDs over the Ethernet with reduced latency.

Figure 6:
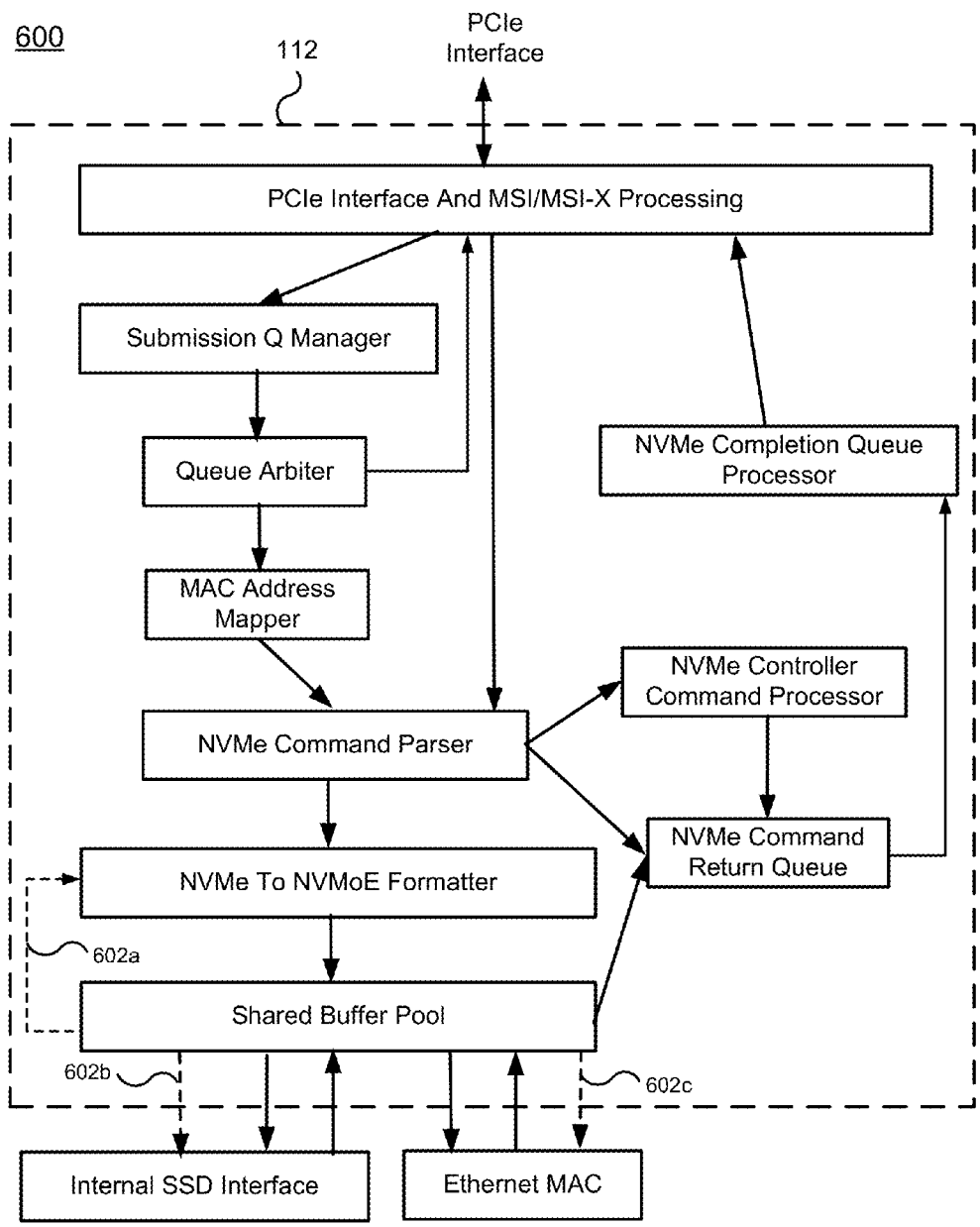
FIG. 6 is a block diagram of detailed structure of the extended NVMe controller, as depicted in FIG. 5.

FIG. 6 illustrates a detailed structure of the extended NVMe controller in accordance with one exemplary embodiment. In the illustrated embodiment, the extended NVMe controller 112 includes a PCIe interface and Message Signaled Interrupts (MSI)/MSI-X processing module for handling command and/or data communication with the PCIe interface. The extended NVMe controller 112 also includes a submission Q manager and a queue arbiter that manage the submission queues. The queue arbiter can also read physical region page (PRP) or scatter gather list (SGL) data from the PCIe interface and MSI/MSI-X processing module. The extended NVMe controller 112 includes a MAC address mapper for mapping the HSID and NSID to MAC addresses. Further, the extended NVMe controller 112 includes an NVMe command parser that parses NVMe commands received from the PCIe interface, and an NVMe-to-NVMoE formatter that formats the NVMe commands to generate NVMoE commands based on the mapped MAC addresses. The extended NVMe controller 112 can also include a shared buffer pool to buffer the NVMoE commands. From the shared buffer pool, the NVMoE commands can then be sent out through an internal SSD interface and Ethernet Media Access Controller (e.g., 10GE MAC or 40GE MAC). The shared buffer pool can provide flow control, as depicted using dashed lines 602a, 602b, 602c, on command and/or data flows from the NVMe-to-NVMoE formatter to the internal SSD interface and Ethernet MAC. The extended NVMe controller 112 also includes an NVMe completion queue processor and NVMe controller command processor that cooperate with the NVMe command parser and the shared buffer pool to buffer and process NVMe command return queues received from the internal SSD interface and the Ethernet MAC interface.

Figure 7:
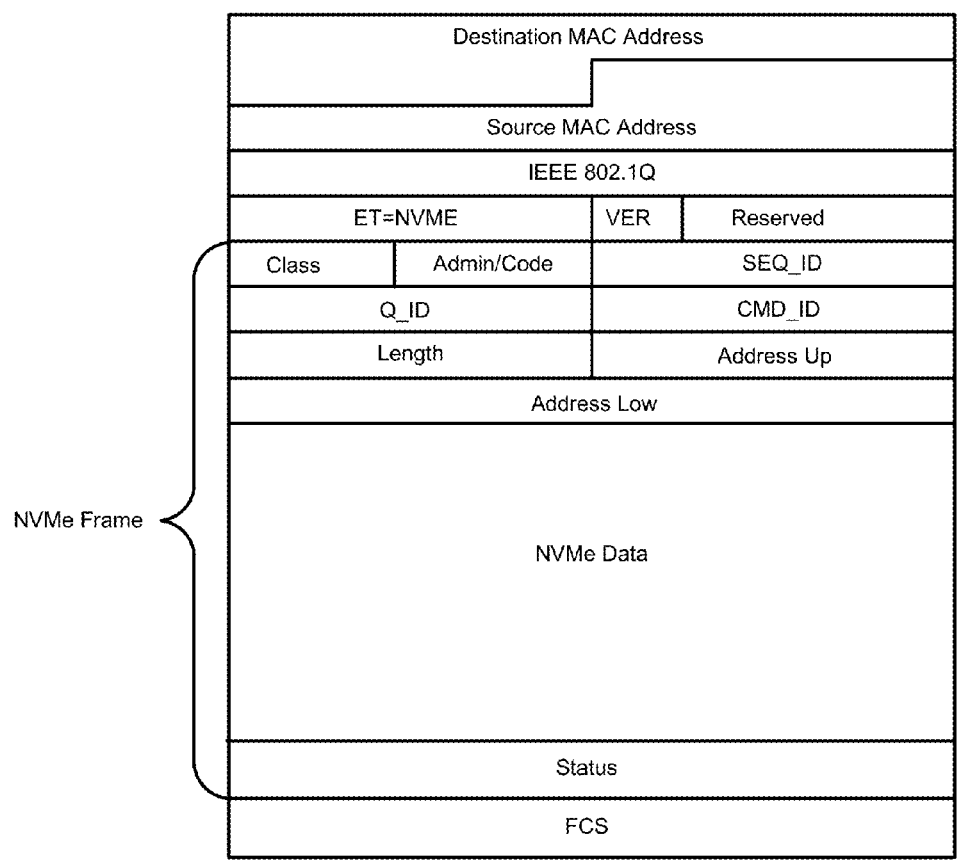
FIG. 7 is a diagram of one embodiment of an NVMoE frame.

FIG. 7 illustrates a structure of the NVMoE frame 700 used by the extended NVMe controller 112 to specify NVMoE commands, in accordance with one exemplary embodiment. Generally, the illustrated NVMoE frame 700 has the same structure as that defined in FIG. 2. However, the NVMoE frame 700, illustrated in FIG. 7, includes a detailed structure of the NVMe frame as one part of the NVMoE frame. The NVMe frame includes a 7-bit class value that defines the type of the frame data of the NVMoE frame data; an Admin/II bit, where 0 indicates that this is an Admin command and 1 indicates that this is an I/O command; a command code as defined in NVMe specification; SEQ_ID[15:0], 16 bits of the sequence tag that define the order of the issued commands in the NVMe I/O command and are used to identify the sequence of the sub-commands in the entire I/O command; Q_ID[15:0], 16 bits of queue ID that identify the submission queue from the initiator; CMD_ID[15:0], 16 bits of command ID that identify the command in the submission queue; LENGTH[15:0], 16 bits of length information that define the size of the command; Address Up and Address Low[47:0], 48 bits of address that point to the logical block address or physical memory address in the NVMe storage device in DWORD; NVMe data describing the NVMe command; and Status[31:0], 32 bits of status field that indicate if the data includes any error or reportable warning message.

Note the NVMe overhead data amounts to less than 1% of the transmitted data when the sector size is 4096 byte or bigger.

Figure 8:
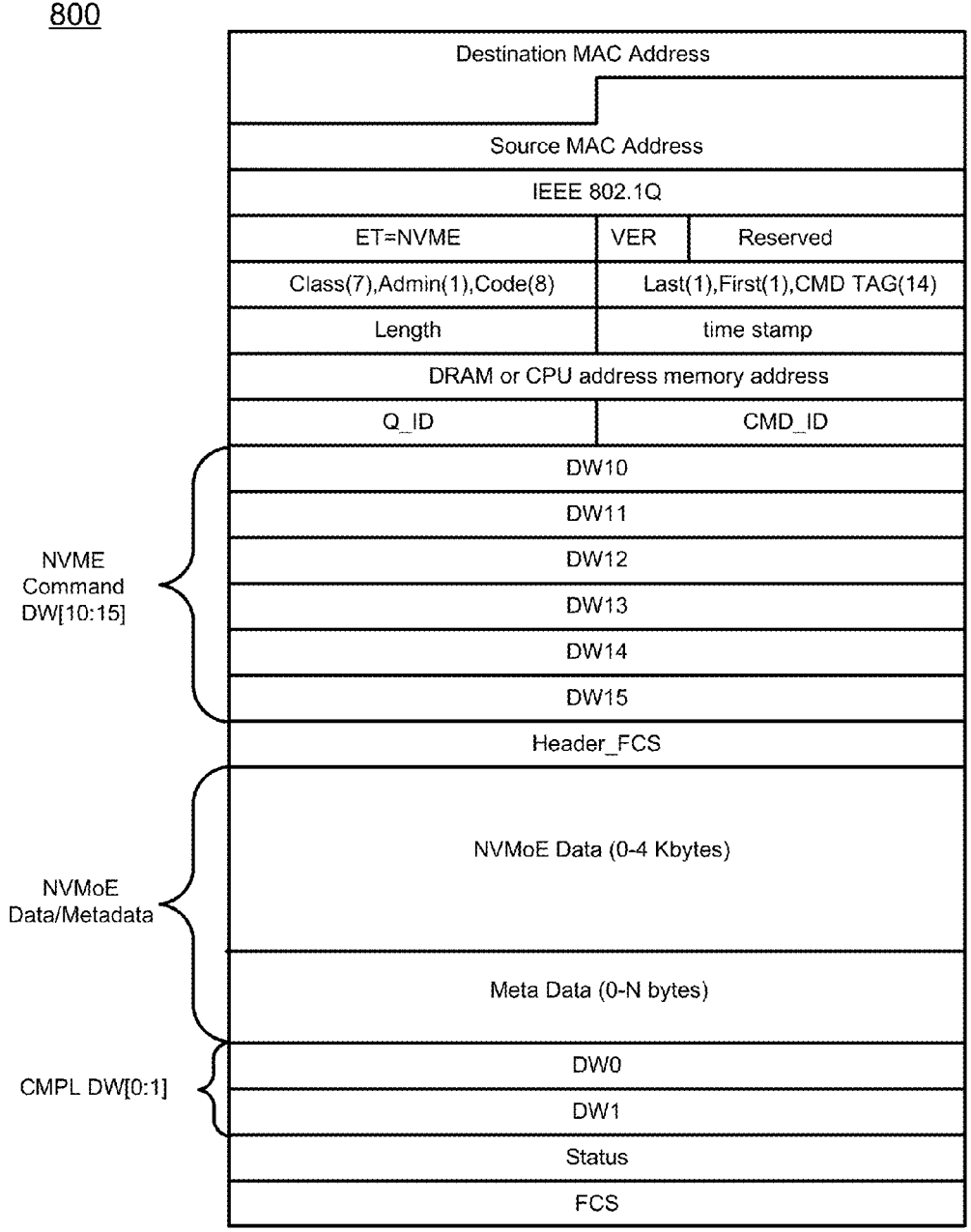
FIG. 8 is a diagram of another embodiment of an NVMoE frame.

FIG. 8 is a diagram of another embodiment of an NVMoE frame 800. Compared with the NVMoE frame 700 shown in FIG. 7, the NVMoE frame 800 additionally includes a time stamp that describes 16 bits of time stamp information used to measure latency; NVME command DW[10:15] that can be passed through NVMoE command frame; header FCS describing the CRC value generated over the NVMoE header; metadata; and completion Double Word (CMPL DWord, or CMPL DW), two DWs for completion as defined in NVMe specification.

In one embodiment, the 802.11Q tag includes a tag protocol identifier, tag control information (priority code point, drop eligible indicator, and VLAN identifier). The Ether Type (ET) may be a new type for NVMe over Ethernet. The bits in the class section may indicate whether a host or storage device was the source of the message, the Peripheral Component Interconnect Express (PCIe) port number, and a PCIe Single Root I/O Virtualization (SR-IOV) virtual function (VF) number.

The admin bit may indicate whether the command is an admin command or an I/O command. The code bits may indicate an opcode. The "last" bit identifies whether the current command in the current frame is the last command in a series of commands as part of an atomic access, and the "first" bit indicates the same but for the first command in the series. The command tag bits may identify the frame in the case where the frame is split into multiple frames due to frame size limitations (e.g., 4 KB per frame).

The reserved bits may indicate an index value of the frame. The memory address bits may indicate the address in the controller memory space that is used for the data transfer process. The queue ID (Q_ID) identifies the submission queue to which the host device CPU issued the command. The command ID (CMD_ID) is set by a host device CPU and may identify the command in the submission queue.

The command DW section may be used to pass command DWORDs to the destination device. When the frame includes an admin command, the final command DWORD (DW15) is the NSID of the command. The Header_FCS bits are a frame check sequence that is a 32-bit cyclic redundancy check (CRC) on the first sixty bits of the header.

The completion queue entry DWORDs (CMPL_DW) indicate the pass or fail status of a physical page address (PPA) command or a write PPA raw data command. The status bits indicate various status information. The high 16 bits of the status bits are status bits of the NVMe specification (e.g., DNR, M, SCT, and SC). The low 16 bits are status bits specific to NVMe over Ethernet. These low bits may have an indication of flow control for admin commands, for read/erase commands, and for write/flush commands. These low bits may indicate various error or warning codes (e.g., high error rate, unrecoverable error, timeout, address out of range, invalid command, packet CRC error, frame mismatch, general failure, and so on). The frame may end with a frame checksum (FCS) that is a CRC for the entire Ethernet frame.

Figure 9:
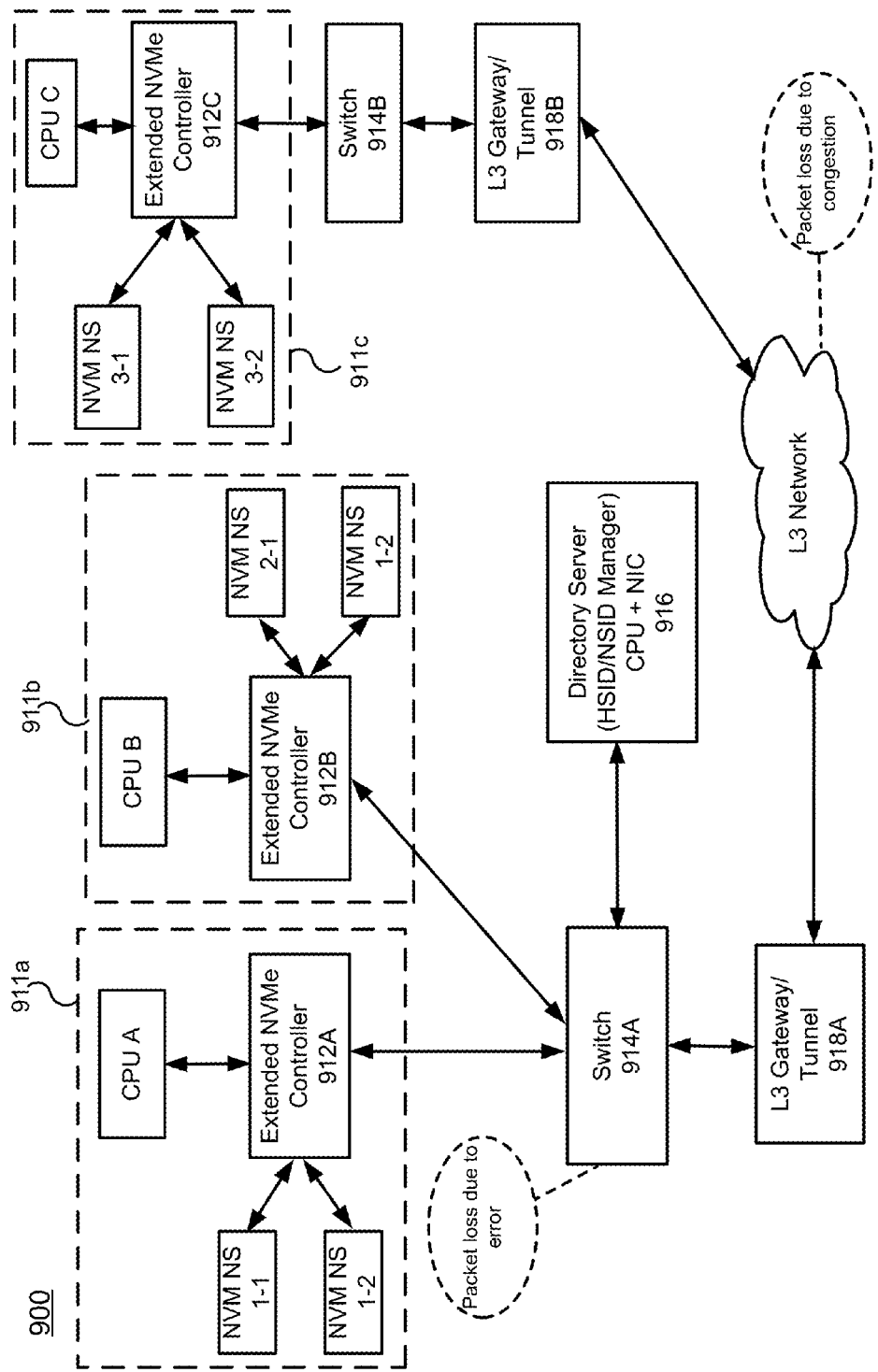
FIG. 9 is a block diagram of an extended NVMe storage system over L3 network.

FIG. 9 illustrates an extended NVMe storage system over L3 network, in accordance with one exemplary embodiment. In the illustrated exemplary embodiment, the system 900 includes similar components as those of the system 100 shown in FIG. 1. For example, the system 900 includes NVMe storage nodes 911a, 911b, 911c (also referred to individually or collectively as 911) that each include an extended NVMe controller 912A, 912B, 912C (also referred to individually or collectively as 912). In one embodiment, the extended NVMe controller 912 has similar functionalities as the extended NVMe controller 112 shown in FIG. 1. For example, the extended NVMe controller 912 can translate NVMe commands into the NVMoE format.

In one embodiment, different from the extended NVMe controller 112, the extended NVMe controller 912 further enables the NVMoE format of frame to travel over L3 networks through gateway/tunnels 918A, 918B (also referred to individually or collectively as 918) such as Stateless Transport Tunnel (STT), Virtual Extensible LAN (VXLAN) or Network Virtualization using Generic Routing Encapsulation (NVGRE). For example, the extended NVMe controller 912 can encapsulate the STT or VXLAN or NVGRE as L3 packet headers and add the L3 packet headers to the NVMoE frame. In one embodiment, in order to support a smaller MTU size such as 1.5 Kbytes, the gateway/tunnel (function) 918 may segment the original NVMoE frame before sending and reassemble the segments into the original NVMoE frame when receiving the segments of the original frame.

FIG. 9 also shows a retry mechanism for a reliable transmission of an I/O command. Although the Converged Enhanced Ethernet Frame is lossless, it is possible that some packet drop happens due to the data corruption or other errors in the Ethernet switch 914A, 914B. Similarly, the loss of the packet data may also occur in the L3 Ethernet network such as due to the traffic congestion of the L3 network. To recover from the loss of transmitted NVMe command data, the extended NVMe storage system 900 can incorporate different types of retry mechanisms. For example, the extended NVMe storage system 900 can implement a hardware-based retry mechanism so that, if a specific I/O command is not coming back, the system 900 can resend the I/O command due to a timeout. The extended NVMe controller 912 assigns a timer for each NVMoE command, and when the extended NVMe controller 912 issues the NVMoE command to the Ethernet interface for transmission, the timer starts running. Accordingly, if the timer is timed out and a corresponding NVMoE command has not come back, it is indicated that the issued NVMoE command has been lost in the network, and the extended NVMe controller 912 thus reissues an NVMoE command for transmission. In this way, the extended NVMe storage system 900 can recover from an NVMoE command loss.

In addition, the system 900 can support a software-based retry mechanism at the NVMe level. The software NVMe driver includes a timer for each issued command. Once a specific NVMe command has not returned when the timer is time out, the software NVMe driver will abort the original NVMe command and resend a new NVMe command.

Figure 10:
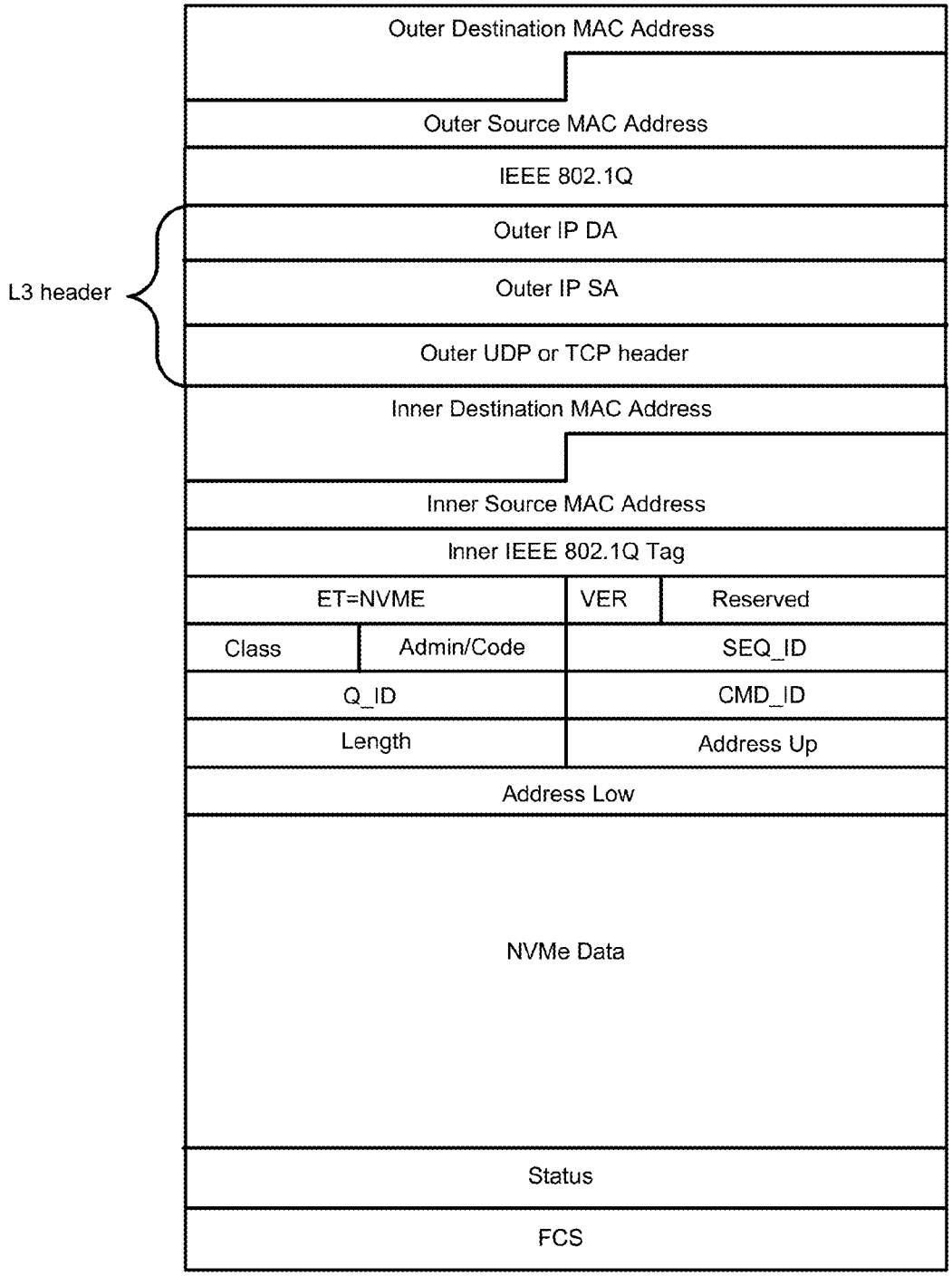
FIG. 10 is a diagram of an NVMoE frame suitable for transmission over L3 network.

Referring now to FIG. 10, illustrated is an NVMoE frame 1000 that is used by the NVMe storage system 900, in accordance with one exemplary embodiment. The NVMoE frame 1000 can travel over L3 networks through gateway/tunnel 918 such as STT, VXLAN or NVGRE. As mentioned above, to enable the NVMoE frame to travel over L3 networks, the extended NVMe controller 912 adds the encapsulation of STT or VXLAN or NVGRE to the NVMoE frame 1000. For example, in the illustrated embodiment, the NVMoE frame 1000 has an L3 packet header inserted into the frame.

Figure 11A:
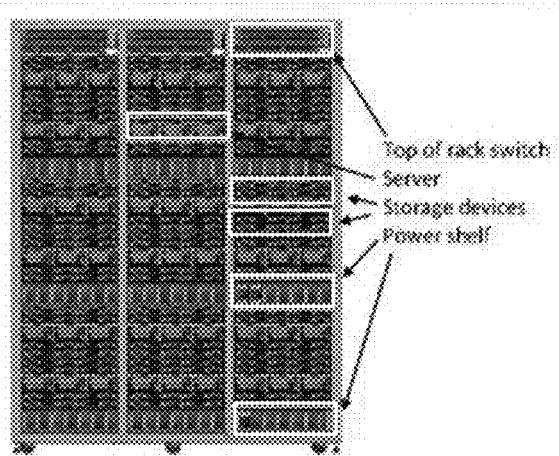
FIGS. 11A-B are diagrams illustrating an application model of the extended NVMe storage network as a server rack.
Figure 11B:
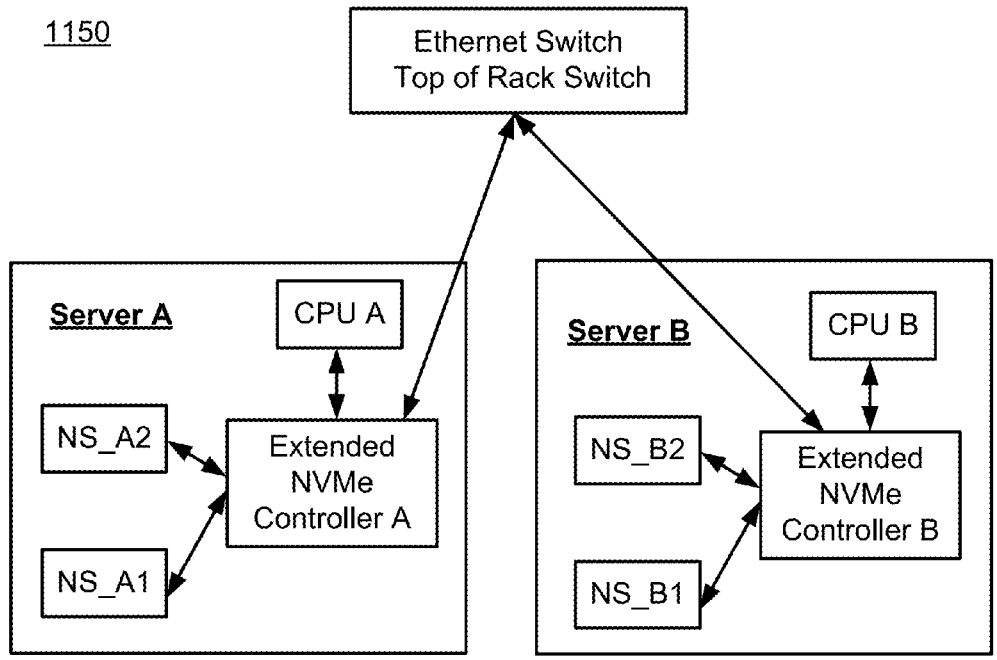

FIGS. 11A-B illustrate an application model of the extended NVMe storage network as a server rack, where extended NVMe controllers communicating via Ethernet switch. The illustrated application model is a server rack and top-of-rack switch system, where the NVMe storage nodes may include servers in the server rack and the external network may include the top-of-rack switch. In the illustrated embodiment, CPU A of server A can access name spaces, NS_B1 and NS_B2, in server B, via the extended NVMe controllers that can send and receive data over the switch. The proposed extended NVMe controllers provide advantages in terms of reduced access latency.

The extended NVMe controllers along with the SSD namespaces are installed in the PCIe slot of the server, the Ethernet connector is connected to the top of rack switch through the Ethernet cable. In this case, the server can share the SSD namespaces through the NVMoE protocol as described by the exemplary embodiment.

Figure 12A:
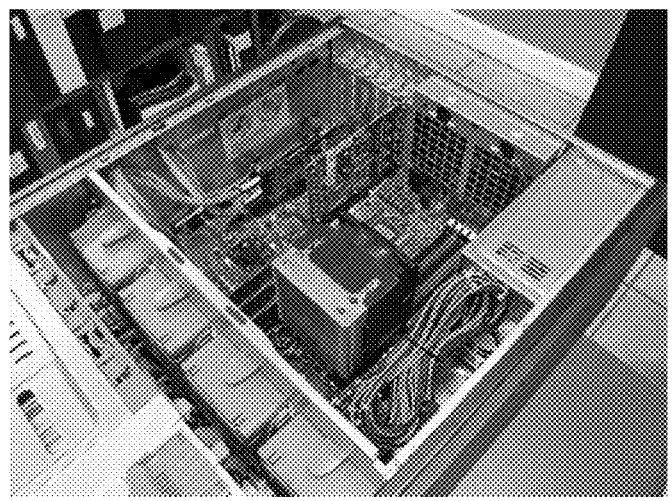
FIGS. 12A-B are diagrams illustrating an application model of the extended NVMe storage network as a single server.
Figure 12B:
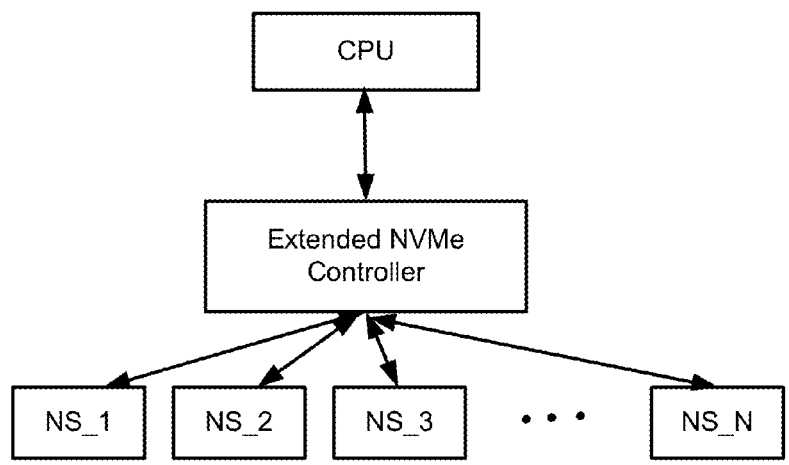

FIGS. 12A-B illustrate an application model of the extended NVMe storage network as a single server system, in accordance with one exemplary embodiment. In the exemplary embodiment, the single server system includes a single host (CPU) and multiple NVMe storage nodes that each includes a dedicated extended NVMe controller and a dedicated local non-volatile memory. The extended NVMe controller can act as a host bus adapter (HBA). There are multiple interfaces coming out of the extended NVMe controller. The extended NVMe controller can then connect each interface to an SSD namespace. This way, the host (CPU) is able to access the SSD namespace with low latency-lower latency than the traditional SAS/SATA interfaces. FIGS. 12A-B also show the HBA initiator and devices.

Figure 13:
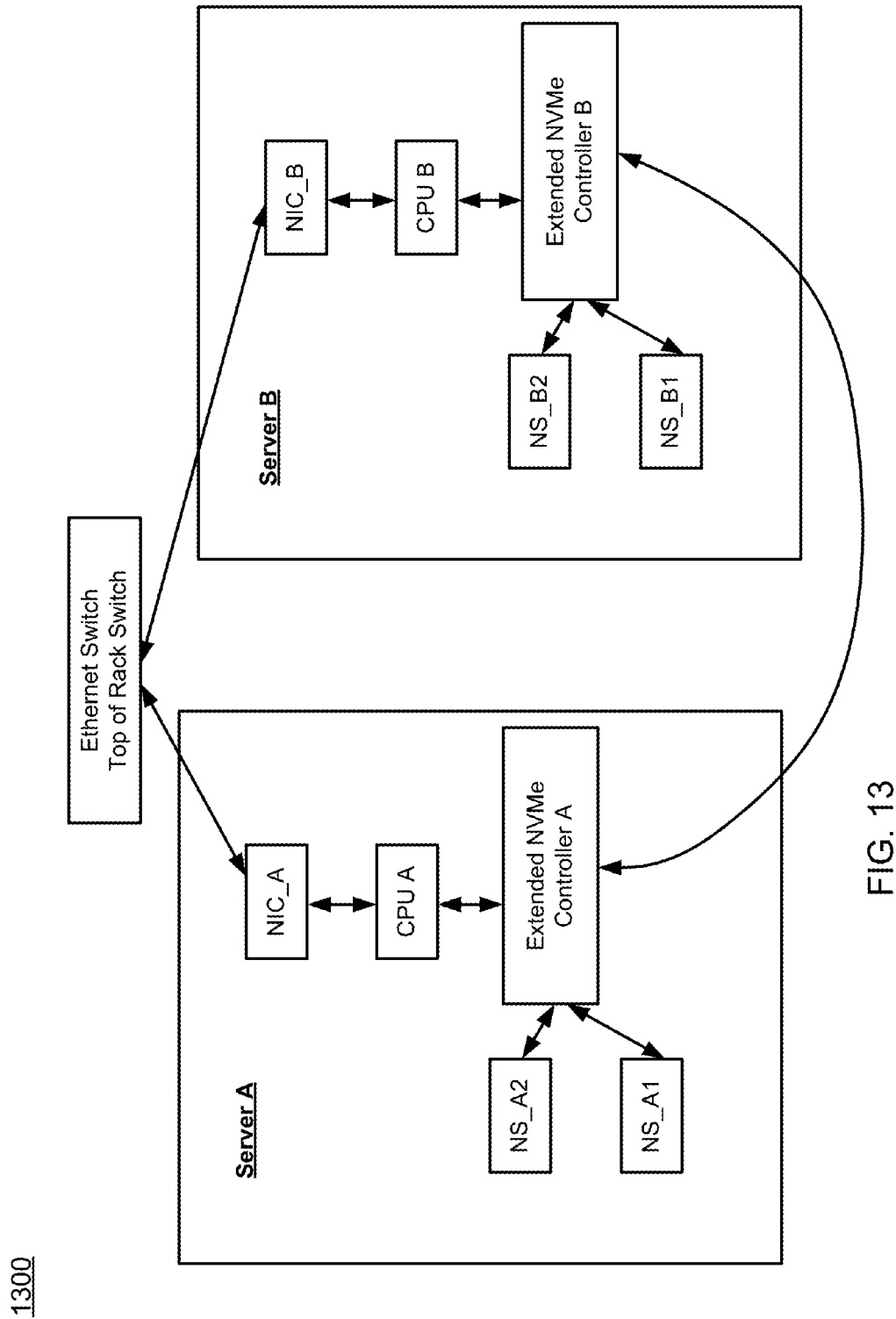
FIG. 13 is a diagram illustrating an application model of the extended NVMe storage network as a dual server system.

FIG. 13 illustrates an application model of the extended NVMe storage network as a high availability dual server system 1300, in accordance with one exemplary embodiment. In the illustrated dual server system 1300, the extended NVMe controllers, along with the SSD namespaces, are installed in the PCIe slot of the servers (e.g., server A, server B). Each server includes a host processor (CPU). The Ethernet connector is used to connect the NVMe controllers in the two servers together. In this case, the server A and the server B can work in Active-Active or Active-Standby mode sharing all the namespaces residing in server A and server B. In case the CPU of one server fails, the other server's CPU can take over. In addition, it is possible that the namespaces residing on the server B can be a mirrored copy of namespaces residing on server A and kept synchronized when namespaces on the server A are written. Accordingly, if server A fails, server B can take over without loss of data.

Note that the name spaces NS_A1, NS_A2, NS_B1 and NS_B2 are logical drives (i.e., collections of blocks of non-volatile memory). They appear as local drives to the CPU A and the CPU B respectively.

Figure 14:
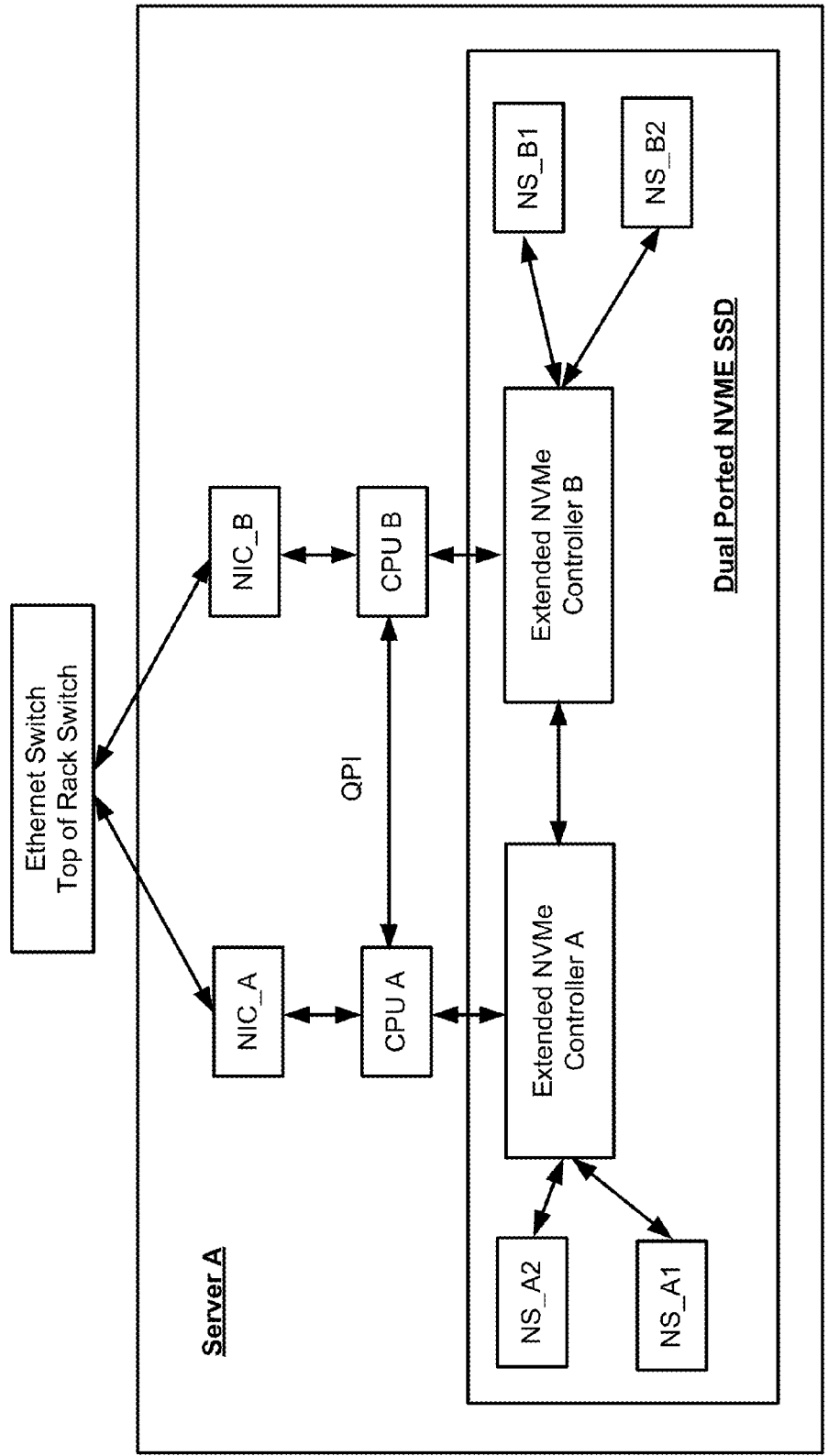
FIG. 14 is a diagram illustrating an application model of the extended NVMe storage network as a dual ported server system.

FIG. 14 is a diagram illustrating an application model of the extended NVMe storage network as a dual ported server system 1400, in accordance with one exemplary embodiment. The system 1400 can be a dual CPU single server system including two extended NVMe controllers with their local namespace controllers. The two extended NVMe controllers connect to each other through Ethernet interface. In the illustrated embodiment, the system 1400 includes two PCIe ports connected to two CPUs with one PCIe interface to each CPU. Each PCIe port connects the CUP to the extended NVMe controller. In this way, the system 1400 can support dual port PCIe SSD controller application.

Figure 15:
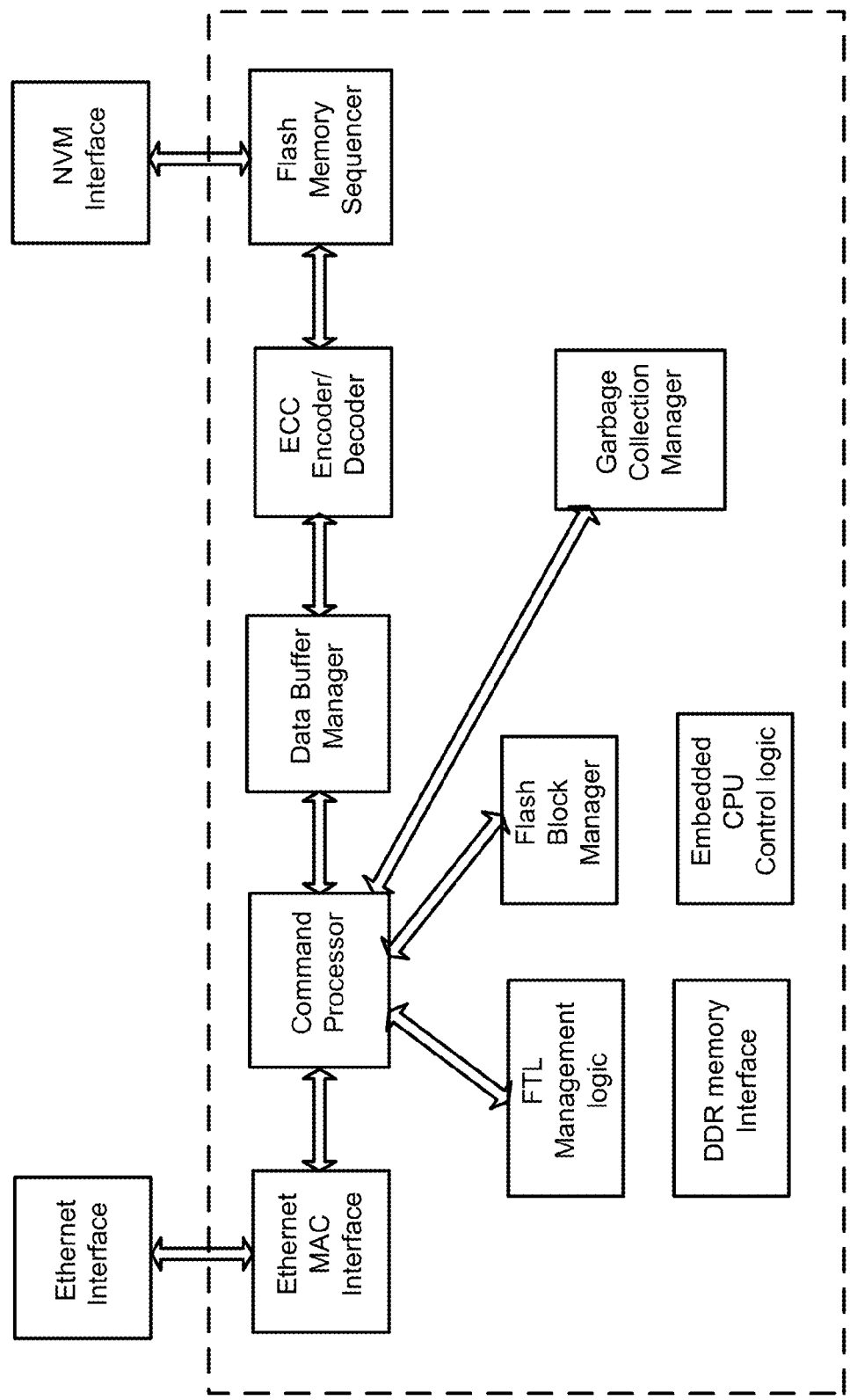
FIG. 15 is a block diagram of a name space controller.

FIG. 15 illustrates a namespace controller, in accordance with one exemplary embodiment. As shown in the exemplary embodiment, the namespace controller includes an Ethernet MAC interface, a command processor, a data buffer manager, an ECC encoder/decoder, a flash memory sequencer, a FTL management logic module, a flash block manager, and a garbage collection manager. The Ethernet MAC interface receives or sends the NVMoE frame. The command processor interprets NVMoE command frame data. The data buffer module stores the NVMoE command after the command is processed by the command processor or received from the ECC decoder. The FTL management logic module optionally converts the logical block Address to the physical page address. The Flash block manager manages the status of a block, whether it is over a certain P/E cycles or needs refreshing. The garbage collection manager manages the timing to recycle a non-volatile memory block data to get more free blocks to erase and write to. The ECC encoder/decoder can optionally add Error Correction Coding capability to correct the non-volatile memory bit errors. The Flash memory interface sequencer controls command and data interface so that data is stored and read based on the NVMoE command and the need of the garbage collection manager.

Figure 16:
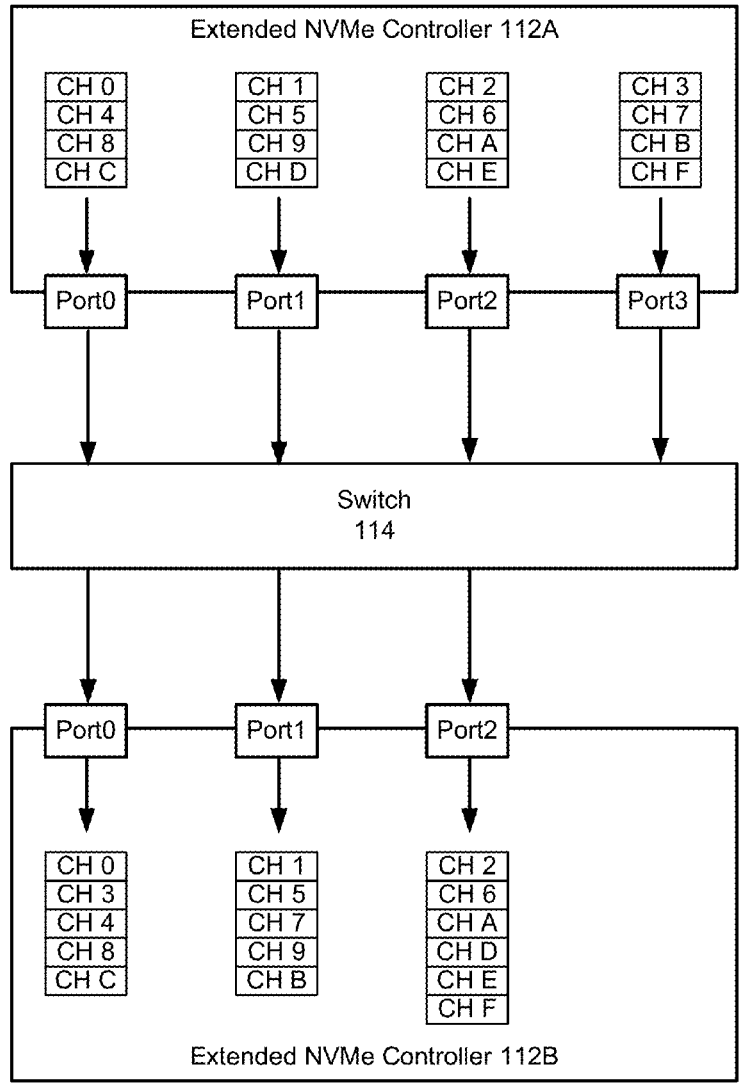
FIG. 16 illustrates an exemplary load balancing mechanism for the extended NVMe controller.

FIG. 16 illustrates an exemplary load balancing mechanism 1600 for the extended NVMe controller 112. Although the exemplary extended NVMe controller 112A illustrated in FIG. 16 includes four source ports and the extended NVMe controller 112B includes three destination ports, in other embodiments the extended NVMe controllers 112A and 112B include a different number of source and/or destination ports. These ports may be, for example, 10GE ports.

Each storage device of a local namespace may have multiple flash memory channels (e.g., NAND physical channels). In some scenarios, sending all channels through a single port of the extended NVMe controller 112 may cause performance bottlenecks. Instead, the extended NVMe controller 112 assigns and may reassign each memory channel to one or more of the source ports based on the low bits (e.g., lower 4 bits) of the physical page address (PPA) or the low bits (e.g., lower 4 bits) of the logical block address (LBA) of the data being read from or written to along with a source port number mask of 4 bits to determine the port to use for each channel. In other embodiments, the extended NVMe controller assigns and may reassign the memory channels across the different ports such that the data traversing each port is equal or within a certain range (e.g., 5%) of each of the other ports. In the load balancing example of FIG. 16A, based on the source port mask for the extended NVMe controller 112A, channels 0, 4, 8, and C are destined for source port 0, channels 1, 5, 9, and D are destined for port 1, channels 2, 6, A, and E are destined for port 2, and channels 3, 7, B, and F are destined for port 3. A similar scheme is used for the destination ports of an extended NVMe controller 112, and an exemplary channel distribution is shown for the three destination ports of the extended NVMe controller 112B in FIG. 16. Using such a method, the flash memory channels are distributed (striped) as evenly as possible across the source/destination ports.

In some embodiments, the extended NVMe controller 112 for the source (i.e., initiator) also determines the ports and their corresponding network addresses for the extended NVMe controller at the destination (i.e., target). This may be via a discovery message sent to a known network address associated with the extended NVMe controller 112 at the destination or by requesting the information from a directory server (e.g., using a notify type message). The extended NVMe controller 112 at the source then distributes the memory channels of the storage device of the local namespace among the various source ports. The extended NVMe controller 112 at the source further directs the individual messages that are transmitted through each of the source ports to the destination ports based on the low bits of the destination port mask for the ports at the destination, such that these messages are distributed evenly across the destination ports. The extended NVMe controller 112 at the source is able to transmit individual messages to different destination ports by changing the destination network address for each message.

In one embodiment, when one of the ports of the extended NVMe controller 112 fails, is removed, or is added, the extended NVMe controller 112 can dynamically reassign the channels for the failed port to other ports based on the lower 4 bits of the PPA/LBA address and a new port number mask based on the changed set of ports.

Figure 17:
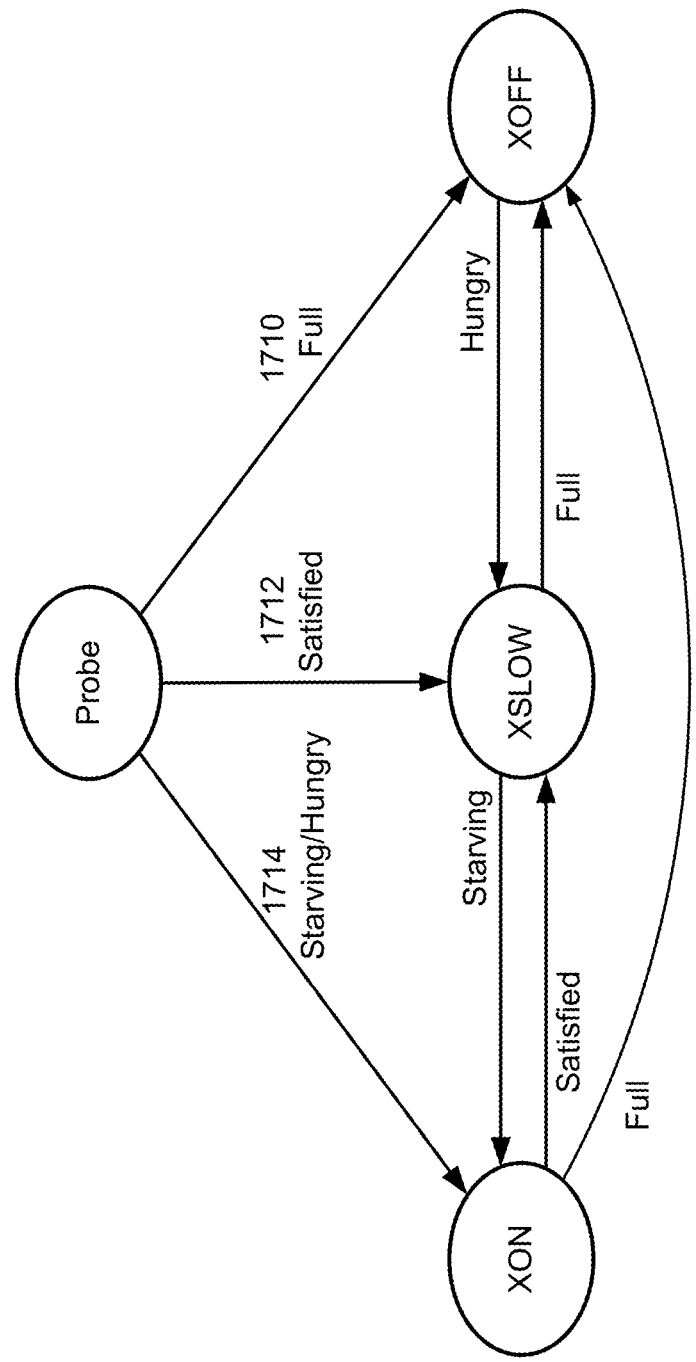
FIG. 17 is an exemplary state diagram for flow control for NVMoE.

FIG. 17 is an exemplary state diagram 1700 for flow control for NVMoE. Although some exemplary states are shown in FIG. 17, in other embodiments the states and transitions between these states can be different. In one embodiment, a source and the corresponding target for NVMoE both support flow control. The source and target may each be a storage node, a host device or a storage device. The source is sending commands to the target. The target has a read buffer, a write buffer, and a control buffer (e.g., for admin commands). The read buffer buffers read requests received from other devices, such as the source. The write buffer buffers write commands received from other devices, and the other control data buffers other control data received from other devices. Of course, the source device may also play the role of a target when it is receiving commands from other devices and will have its own set of buffers for flow control.

The state diagram of FIG. 17 is used to control flow from the source to the target and may be applied separately to each of the target's three buffers. When the buffer status reaches certain levels, the target sends a flow control message to the source to indicate the status level of the buffer. In FIG. 17, these buffer levels are "Starving", "Hungry", "Satisfied", and "Full" in order from most empty to most full, with Starving indicating that the buffer is empty or near empty and Full indicating that the buffer is at or near capacity. The source receives the flow control messages and may then reduce the flow or increase the flow of data or control data to the target, according to the state diagram of FIG. 17.

In addition to the status level of the target buffer, FIG. 17 also shows states for the source: "XON" "XSLOW" "XOFF" and "Probe." The source may initially begin in the Probe state. In the Probe state, the source may first determine the buffer status of the target. If the status level of the buffer is Full, then the source transitions 1710 to the sending state XOFF for that target, in which case no data or control data is sent. Instead, the source may delay for a period of time, send another probe request to the target, and send the data when the response to that probe request indicates a different buffer status. If the status level is Satisfied, then the source transitions 1712 to the sending state "XSLOW", in which case data or control data is sent at a slow or reduced speed (e.g., half the full speed). If the status level is Hungry or Starving, then the source transitions 1714 to sending state "XON", in which case data or control data is sent at full speed.

Periodically, the source may poll the target regarding the status level of the target's buffer or the target may otherwise update its status level. The source changes states according to the state diagram of FIG. 17, depending upon the target's flow control message. Note that the state diagram has hysteresis. For example, if the source is in state XON, a status level of Hungry will keep the state as XON and a status level of Satisfied will move the state to XSLOW. However, once the source is in state XSLOW, a status level of Hungry will not move the state back to XON. Rather, the state will stay at XSLOW due to the hysteresis, and the lower status level of Starving is required to move the state to XON.

In one embodiment, when the source sends data or control data to the target, the source also sends its current indicator of the buffer status level of the respective buffer for the target. If the target determines that this buffer status level is incorrect, the target sends the correct buffer status level to the source, which then updates its current indicator of the buffer status level and changes the sending state if necessary.

In one embodiment, the source periodically sends its current indicator of the buffer status level to the target for a predefined time interval (e.g., every one second).

In one embodiment, if the source is unable to determine the buffer status level of the target, then a timeout may occur after a specified period and the source may return to the Probe state of FIG. 17.

Figure 18:
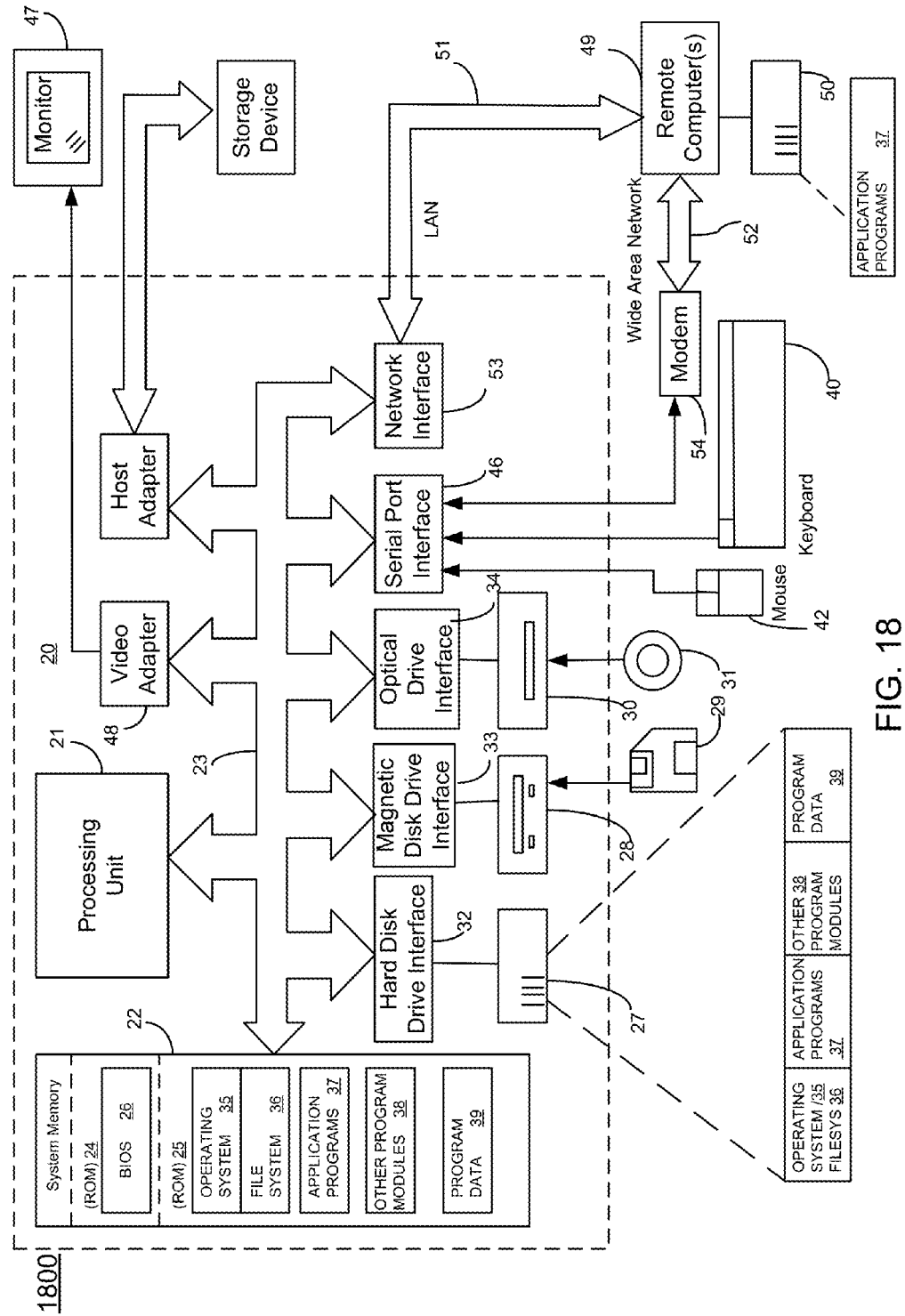
FIG. 18 is a block diagram of a schematic example of a computer or a server that can be used in the present invention.

With reference to FIG. 18, an exemplary computing system 1800 for implementing the invention is illustrated. The computing system 1800 includes a general purpose computing device (i.e., a host node) in the form of a personal computer (or a node) 20 or server or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 20, such as during start-up, is stored in ROM 24. The personal computer/node 20 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), solid state drives and the like may also be used in the exemplary operating environment.

A number of program modules may be stored on the hard disk, solid state drive, magnetic disk 29, optical disk 31, ROM 24 or RAM 25, including an operating system 35 (preferably WINDOWS™). The computer 20 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a solid state drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI, PCIe and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks, Intranets and the Internet. When used in a LAN networking environment, the personal computer 20 is connected to the local area network 51 through a network interface or adapter 53.

When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations, which will be apparent to those, skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

What is claimed is:

1. An extended Non-Volatile Memory Express (NVMe) controller device, comprising:
   a host interface adapted to couple the extended NVMe controller to a host processor;
   a direct network interface adapted to couple the extended NVMe controller to an external network, the direct network interface having a plurality of local ports connecting to the external network;
   hardware logic configured to receive from the host processor NVMe commands directed to a remote namespace with remote non-volatile memory that is coupled to the external network, and to convert the NVMe commands to a format suitable for transmission over the external network to a remote extended NVMe controller coupled to the remote namespace, wherein the converted NVMe commands are passed to the direct network interface to be transmitted over the external network;
   a local storage interface adapted to couple the extended NVMe controller to a local namespace for a local non-volatile memory via a plurality of memory channels of the local non-volatile memory;

wherein the hardware logic is further configured to assign each memory channel to one of the plurality of local ports of the direct network interface;

wherein the remote extended NVMe controller includes a remote direct network interface having a plurality of destination ports connecting to the external network, and the hardware logic is further configured to assign each memory channel to one of the plurality of destination ports; and wherein the hardware logic is further configured to be able to reassign the plurality of memory channels to the plurality of local ports of the extended NVMe controller and to reassign the plurality of memory channels to the plurality of destination ports of the remote extended NVMe controller.

2. The extended NVMe controller device of claim 1, wherein the plurality of memory channels are assigned and reassignable to the plurality of local ports in a distribution such that an amount of traffic travelling through each port of the plurality of local ports is within a certain range of an amount of traffic travelling through each one of the other ports of the plurality of local ports.

3. The extended NVMe controller device of claim 1, wherein the plurality of local ports are adapted to transmit data to the remote extended NVMe controller.

4. The extended NVMe controller device of claim 1, wherein the plurality of local ports are adapted to receive data from the remote extended NVMe controller.

5. The extended NVMe controller device of claim 1, wherein the plurality of memory channels are dynamically reassigned to remaining ports of the plurality of local ports responsive to failure of one or more of the plurality of local ports.

6. The extended NVMe controller device of claim 1, wherein the plurality of memory channels are dynamically reassigned to remaining ports of the plurality of local ports responsive to the shutdown of one or more of the plurality of local ports.

7. The extended NVMe controller device of claim 1, wherein each of the plurality of memory channels is assigned to one of the plurality of local ports based on a lower number of bits of the physical page address field associated with that memory channel.

8. The extended NVMe controller device of claim 1, wherein each of the plurality of memory channels is assigned to one of the plurality of local ports based on a lower number of bits of the logical block address field associated with that memory channel.

9. The extended NVMe controller device of claim 1, wherein each of the plurality of memory channels is assigned to one of the plurality of local ports based on a port mask associated with the one of the plurality of local ports.

10. The extended NVMe controller device of claim 1, wherein the external network includes an Ethernet network, each of the plurality of local ports is an Ethernet port, and each of the plurality of destination ports is an Ethernet port.

11. The extended Non-Volatile Memory Express (NVMe) controller device of claim 1, wherein:

the host interface is a host PCI Express (PCIe) interface adapted to couple the extended NVMe controller to the host processor;

the external network includes an Ethernet network and the direct network interface is a direct Ethernet interface adapted to couple the extended NVMe controller to the external Ethernet network; and the hardware logic includes a command translator configured to convert the NVMe commands to NVM-over-Ethernet (NVMoE) commands that are suitable for transmission over the external Ethernet network.

12. The extended Non-Volatile Memory Express (NVMe) controller device of claim 11, further comprising:

a submission queue manager that manages NVMe command submission queues for the host processor.

13. A computer-implemented method in an extended Non-Volatile Memory Express (NVMe) controller device for load balancing, comprising:

receiving from a host processor, NVMe commands directed to a remote namespace for a remote non-volatile memory coupled to an external network via a remote direct network interface, the extended NVMe controller also coupled to the external network via a local direct network interface;

retrieving data indicated in the NVMe commands from a plurality of memory channels of a local non-volatile memory of a local namespace;

assigning each of the memory channels to one of a plurality of local ports of the local direct network interface, wherein the memory channels are reassignable to the plurality of local ports;

assigning each of the memory channels to one of a plurality of destination ports of the remote direct network interface, wherein the memory channels are reassignable to the plurality of destination ports;

converting the received NVMe commands to a format suitable for transmission over the external network a remote extended NVMe controller coupled to the remote namespace; and transmitting the converted NVMe commands including the data over the external network to the remote extended NVMe controller, said transmission using the local ports and destination ports assigned to the memory channels for the converted NVMe commands.

14. The method of claim 13, wherein the plurality of memory channels are assigned and reassignable to the plurality of local ports in a distribution such that an amount of traffic travelling through each port of the plurality of local ports is within a certain range of an amount of traffic travelling through each one of the other ports of the plurality of local ports.

15. The method of claim 13, wherein the plurality of local ports are adapted to transmit data to the remote extended NVMe controller.

16. The method of claim 13, wherein the plurality of local ports are adapted to receive data from the remote extended NVMe controller.

17. The method of claim 13, wherein the plurality of memory channels are dynamically reassigned to remaining ports of the plurality of local ports responsive to failure of one or more of the plurality of local ports.

18. The method of claim 13, wherein the plurality of memory channels are dynamically reassigned to remaining ports of the plurality of local ports responsive to the shutdown of one or more of the plurality of local ports.

19. The method of claim 13, wherein each of the plurality of memory channels is assigned to one of the plurality of local ports based on a lower number of bits of the physical page address field associated with that memory channel.

20. The method of claim 13, wherein each of the plurality of memory channels is assigned to one of the plurality of local ports based on a lower number of bits of the logical block address field associated with that memory channel.

21. The method of claim 13, wherein each of the plurality of memory channels is assigned to one of the plurality of local ports based on a port mask associated with the one of the plurality of local ports.

22. The method of claim 13, wherein the external network includes an Ethernet network, each of the plurality of local ports is an Ethernet port, and each of the plurality of destination ports is an Ethernet port.

* * * * *